US010489262B1

United States Patent
Chintalapoodi

(10) Patent No.: US 10,489,262 B1
(45) Date of Patent: Nov. 26, 2019

(54) MULTI-TOUCH DETECTION IN MOISTURE

(71) Applicant: Synaptics Incorporated, San Jose, CA (US)

(72) Inventor: Prakriti Chintalapoodi, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 59 days.

(21) Appl. No.: 15/608,600

(22) Filed: May 30, 2017

(51) Int. Cl.
*G06F 11/30* (2006.01)
*G06F 3/06* (2006.01)
*G06F 3/041* (2006.01)

(52) U.S. Cl.
CPC ........ *G06F 11/3075* (2013.01); *G06F 3/0418* (2013.01); *G06F 3/0656* (2013.01)

(58) Field of Classification Search
None
See application file for complete search history.

(56) References Cited

U.S. PATENT DOCUMENTS

| | | | |
|---|---|---|---|
| 9,430,066 B2* | 8/2016 | Davidson | G06F 3/041 |
| 9,977,546 B2* | 5/2018 | Ningrat | G06F 3/044 |
| 2015/0277662 A1* | 10/2015 | Liu | G06F 3/0418 |
| | | | 345/174 |
| 2016/0231862 A1* | 8/2016 | Tretter | G06F 3/0416 |

* cited by examiner

*Primary Examiner* — Kenneth B Lee, Jr.
(74) *Attorney, Agent, or Firm* — Paradice & Li LLP

(57) ABSTRACT

A method of detecting touch inputs, in the presence of moisture, in a sensing region of an input device. The input device acquires sensor information about the sensing region via a plurality of sensor electrodes configured for capacitive sensing. A first capacitive image of the sensing region is generated based on the received sensor information. The input device further determines a set of contiguous regions in the first capacitive image and selects, from the set of contiguous regions, one or more contiguous regions that correspond to valid inputs. The one or more contiguous regions may be selected based at least in part on a plurality of capacitive images previously acquired for the sensing region. The input device may further report positional information for each of the selected contiguous regions. For example, the positional information may be used to process user inputs associated with the selected contiguous regions.

27 Claims, 19 Drawing Sheets

MULTI-TOUCH DETECTION IN MOISTURE

TECHNICAL FIELD

The present embodiments relate generally to capacitive sensing, and specifically to detecting one or more touch inputs in the presence of moisture.

BACKGROUND OF RELATED ART

Input devices including proximity sensor devices (also commonly referred to as touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensors may operate by detecting changes in an electric field and/or capacitance in the sensing region. In order to detect such changes, the proximity sensors may first determine a "baseline" (e.g., indicating a state of the electric field when no input object is expected to be present) for one or more portions of the sensing region. However, establishing an incorrect baseline may cause the proximity sensors to report "ghost" touches (e.g., false positives) and/or fail to report intentional touches (e.g., false negatives). Many factors may contribute to an incorrect baseline estimate including, for example, moisture and/or other objects in contact with the sensing region when attempting to detect a user input. Thus, it is desirable to filter ghost touches from intentional touches when processing user inputs from the sensing region.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of detecting touch inputs, in the presence of moisture, in the sensing region of an input device is disclosed. The input device acquires sensor information about the sensing region via a plurality of sensor electrodes configured for capacitive sensing. A first capacitive image of the sensing region is generated based on the received sensor information. The input device further determines a set of contiguous regions in the first capacitive image and selects, from the set of contiguous regions, one or more contiguous regions that correspond to valid inputs. The one or more contiguous regions may be selected based at least in part on a plurality of capacitive images previously acquired for the sensing region. The input device may further report positional information for each of the selected contiguous regions.

The input device may include a circular buffer configured to store a number of capacitive images of the sensing region. In some aspects, the input device may generate a delta image based on differences between the first capacitive image and the plurality of capacitive images previously acquired for the sensing region. Each contiguous region in the set of contiguous regions may be associated with one or more pixel values from the delta image. The input device may then determine, for each contiguous region in the set of contiguous regions, whether the contiguous region corresponds with a new input based at least in part on the associated pixel values from the delta image.

In some aspects, the input device may identify a position of a corresponding input in each of the selected contiguous regions based at least in part on the associated pixel values from the delta image. Accordingly, the input device may report positional information for the identified position in each of the selected contiguous regions. In some other aspects, the input device may detect that one of the selected contiguous region is associated with two or more inputs based at least in part on the associated pixel values from the delta image. Accordingly, the input device may split the detected contiguous region into two or more contiguous regions based on the associated pixel values from the delta image.

The input device may determine whether the contiguous region corresponds with a new input by comparing the associated pixel values with a threshold value. When the associated pixel values exceed the threshold value, the input device may selectively associate the contiguous region with a new input based at least in part on a number of contiguous regions identified in a previous capacitive image. For example, the input device may determine a number of contiguous regions corresponding to valid inputs in the previous capacitive image, compare the number of contiguous regions with a maximum number (M) of inputs detectable by the input device, and selectively associate the contiguous region with a new input based at least in part on the comparison.

In some embodiments, the input device may identify a set of first bounding boxes indicating respective boundaries of each of the contiguous regions corresponding to valid inputs in the previous capacitive image. In some aspects, a contiguous region may be associated with a new input when the contiguous region does not overlap any of the first bounding boxes and the number of contiguous regions corresponding to valid inputs in the previous capacitive image is less than the maximum number of inputs detectable by the input device. In some other aspects, a contiguous region may be merged with another contiguous region in the set of contiguous regions when the contiguous region overlaps at least one of the first bounding boxes or the number of contiguous regions corresponding to valid inputs in the previous capacitive image is equal to the maximum number of inputs detectable by the input device.

The input device may be configured to detect a pinch or zoom gesture when two or more of the first bounding boxes intersect and a first contiguous region in the set of contiguous regions overlaps each of the two or more first bounding boxes. For example, the first contiguous region may be formed from a union of two or more contiguous regions corresponding to valid inputs in the previous capacitive image.

The input device may select the one or more contiguous regions that correspond to valid inputs by generating up to M second bounding boxes around one or more contiguous regions in the set of contiguous regions, pairing each of the second bounding boxes with a respective contiguous region in the set of contiguous regions, and eliminating any contiguous regions not paired with a respective one of the second bounding boxes. When a particular contiguous region in the set of contiguous regions overlaps two or more of the second bounding boxes, the input device may determine that the particular contiguous region coincides with one of the two or more second bounding boxes based on an amount of overlap between the particular contiguous region and each of the two or more second bounding boxes.

In some aspects, the input device may detect that a particular bounding box of the second bounding boxes coincides with two or more contiguous regions in the set of contiguous regions. Accordingly, the input device may determine which of the two or more contiguous regions is most likely to correspond with a valid input based on a shape or amplitude of each of the two or more contiguous regions. The input device may pair the particular bounding box with the contiguous region that is most likely to correspond with a valid input. In some other aspects, the input device may trim the respective contiguous region paired with each of the second bounding boxes based at least in part on the associated pixel values from the delta image.

BRIEF DESCRIPTION OF THE DRAWINGS

The present embodiments are illustrated by way of example and are not intended to be limited by the figures of the accompanying drawings.

DETAILED DESCRIPTION

Figure 1:
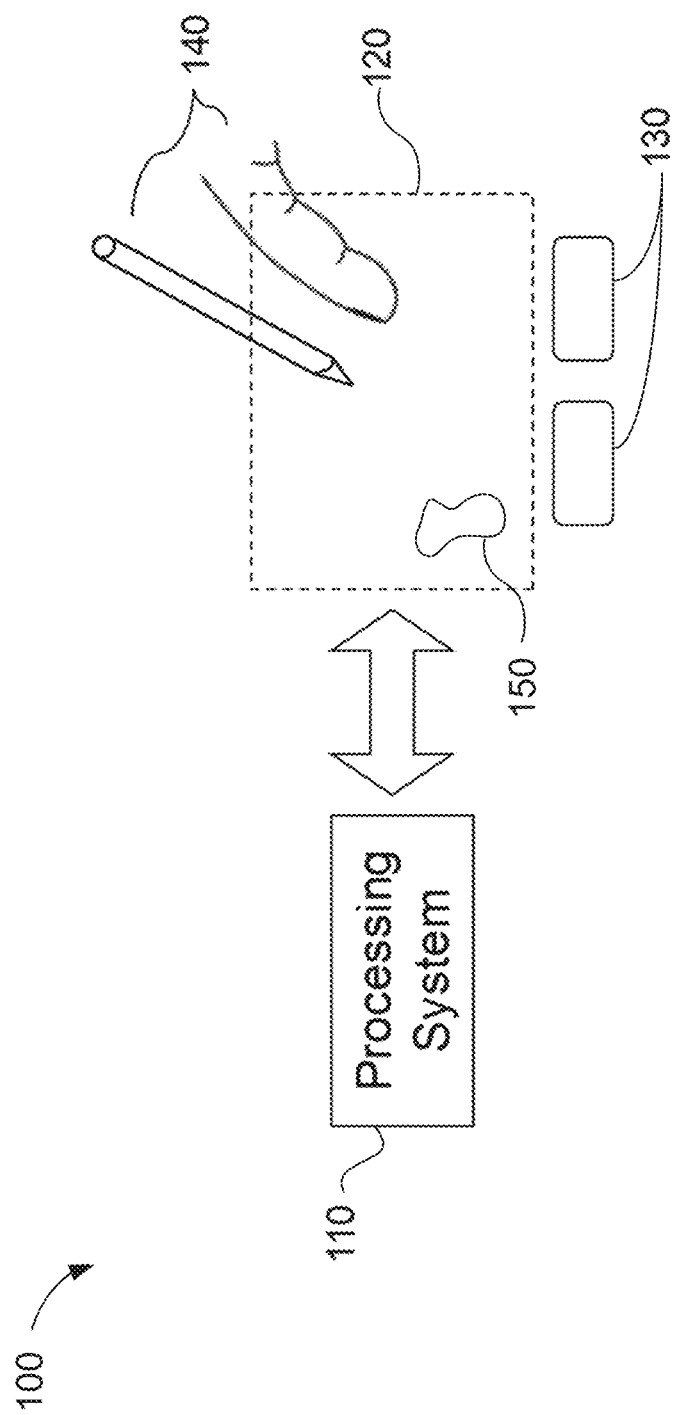
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory.

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, and optical sensing technologies. In some embodiments, the input device 100 may include one or more sensing elements configured to implement the various sensing technologies.

In some embodiments, the input device 100 may utilize resistive sensing technologies to detect user inputs. For example, the sensing region 120 may be formed by a flexible and conductive layer separated, by one or more spacer elements, from a conductive second layer. The sensing region 120 may detect user input by creating one or more voltage gradients across the layers, and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information (e.g., indicating a position, in the sensing region 120) about the detected inputs.

In some other embodiments, the input device 100 may utilize inductive sensing technologies to detect user inputs. For example, the sensing region 120 may include one or more sensing elements configured to pick up loop currents induced by a resonating coil or pair of coils. The input device 100 may then detect user inputs based on a combination of the magnitude, phase, and/or frequency of the currents. The characteristics of the loop currents may further be used to determine positional information about the detect inputs.

Still further, in some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some embodiments, the processing system 110 may control one or more sensor electrodes to detect and/or identify objects in the sensing regions 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 100 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The processing system 110 may respond to user input in the sensing region 120 by triggering one or more actions. Example actions include changing an operation mode of the input device 110 and/or graphical user interface (GUI) actions such as cursor movement, selection, menu navigation, and the like. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the processing system 110 may further determine positional information for a detected input, recognize handwriting, and the like. The term "positional information," as used herein, refers to any information describing or otherwise indicating a position or location of the detected input (e.g., within the sensing region 120). Example positional information may include absolute position, relative position, velocity, acceleration, and/or other types of spatial information. The term "zero-dimensional" positional information, as used herein, refers to any information describing a relative proximity of the detected input. Example zero-dimensional positional information may include how near or far an object is to the sensing region 120, or whether the object is in contact with the sensing region 120.

The term "one-dimensional" positional information, as used herein, refers to information describing a position of the detected input along a particular axis. The term "two-dimensional" positional information, as used herein, refers to information describing a position of the detected input in a plane. The term "three-dimensional" positional information, as used herein, refers to information describing a position of the detected input in space. Further examples of positional information may include historical information, for example, indicating changes in position, movement, or instantaneous velocity of the detected input.

The input device 100 may include additional input components that can be operated by the processing system 110 or another processing system. In some aspects, the additional input components may provide redundant functionality for detecting input in the sensing region 120. For example, in some embodiments, the additional input components may include "auxiliary" sensor devices (not shown for simplicity) capable of detecting objects in (or proximate to) the sensing region 120 using other sensing technologies (such as cameras and/or optical sensors). In other aspects, the additional input components may provide additional functionality to complement the input detection capabilities of the sensing region 120. For example, in some embodiments, the additional input components may include buttons 130 that can be used to facilitate selection of items using the input device 100. Other types of additional input components may include sliders, balls, wheels, switches, and the like.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

A display electrode may include one or more segments of a Vcom electrode (common electrodes), source drive lines (electrodes), gate lines (electrodes), an anode sub-pixel electrode or cathode pixel electrode, or any other display element. These display electrodes may be disposed on an appropriate display screen substrate. For example, the display electrodes may be disposed on a transparent substrate (such as a glass substrate, TFT glass, or any other transparent material) in a display screen (e.g., in plane switching (IPS), fringe field switching (FFS), plane to line switching (PLS), or OLED), on the bottom of the color filter glass of a display screen (e.g., patterned vertical alignment (PVA), multi-domain vertical alignment (MVA), IPS, or FPS), over a cathode layer (such as OLED), and the like. In such embodiments, the display electrode may be referred to as a "combination electrode," since it performs multiple functions. In some aspects, there exists a one-to-one relationship between a sensor electrode and a display electrode (corresponding to a particular pixel or sub-pixel of the display). In other aspects, two or more sensor electrodes may correspond to the same display electrode (or pixel).

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sensing user inputs, concurrently. In another example, the processing system 110 may drive a first display electrode to display at least a portion of the interface while concurrently driving a second display electrode to sense user inputs.

The processing system 110 may execute instructions related to sensing inputs and displaying the interface at different times (herein referred to as non-display update periods). In some aspects, the non-display update periods may occur between display line update periods of a common display frame, and may be at least as long as a display line update period. In other aspects, the non-display update periods may occur between display line update periods of a common display frame, and may be either longer or shorter than a display line update period. The non-display update periods may occur at the beginning of a display frame and/or between display frames. In some embodiments, the processing system 110 may be configured to drive one or more of the sensor electrodes and/or display electrodes with a shield signal. For example, the shield signal may be a constant voltage signal or a varying voltage signal (such as a guard signal). In some aspects, one or more of the sensor electrodes and/or display electrodes may be electrically floated.

As described above, the processing system 110 may detect user input in the sensing region 120 based on changes in an electric field (or capacitance level) provided by corresponding sensor electrodes. More specifically, the processing system 110 may continuously (or periodically) detect the capacitance of a sensor electrode and compare the detected capacitance against a baseline capacitance level (e.g., corresponding to a state of the sensor electrode when no input is detected). The processing system 110 may sense a user input in a given portion of the sensing region 120 if the capacitance detected across one or more sensor electrodes in the given portion differs from their respective baselines by a threshold amount. Therefore, moisture and/or other objects in contact with the sensing region 120 could cause the sensor electrodes to report ghost touches (e.g., false positives) and/or fail to report intentional touches (e.g., false negatives).

Aspects of the present disclosure may use information derived from multiple capacitive images to filter ghost touches from intentional touches detected in the sensing region 120. As described in greater detail below, the sensing region 120 may be formed by a plurality of transmitter sensor electrodes and receiver sensor electrodes that are arranged in a grid-like formation. Objects in the sensing region 120 may be detected via one or more transmitter-receiver pairs. Thus, the intersection of each transmitter-receiver pair may represent a "pixel" of the sensing region

120. Each pixel may have an "amplitude" and/or other attributes based on the capacitance (or change in capacitance) detected by the associated receiver sensor electrode. In some embodiments, the processing system 110 may receive sensor information from the plurality of sensor electrodes, and may combine or aggregate the pixel values associated with each transmitter-receiver pair to generate a two-dimensional capacitive "image" of the sensing region 120.

The capacitive image of sensing region 120 may include one or more "contiguous regions." As used herein, the term "contiguous region" may refer to a number of connected or adjacent pixels in the capacitive image with amplitudes exceeding a threshold amplitude. In some aspects, the processing system 110 may identify contiguous regions in a capacitive image using well-known image segmentation techniques. While user inputs 140 (such as from a finger, stylus, or other input device) may register as contiguous regions in a capacitive image, interference objects 150 (such as from water or moisture) may also register as contiguous regions in the same capacitive image. Therefore, it is desirable to filter the contiguous regions of a capacitive image to distinguish between contiguous regions that are associated with user inputs 140 and contiguous regions that are associated with interference objects 150. More specifically, it may be desirable to process only the contiguous regions associated with user inputs 140 while eliminating or ignoring the contiguous regions associated with interference objects 150.

In some implementations, the processing system 110 may use absolute capacitance sensing techniques, in conjunction with transcapacitance sensing techniques, to distinguish user inputs 140 from interference objects 150. For example, absolute capacitance ("abscap") sensing techniques may produce one or more one-dimensional "profiles" indicating in which rows or columns (of the sensing region 120) user inputs 140 are detected. In some aspects, an abscap profile may indicate one or more rows in which the user inputs 140 are detected. In some other aspects, an abscap profile may indicate one or more columns in which the user inputs 140 are detected. Thus, the processing system 110 may compare a capacitive image with one or more abscap profiles to identify contiguous regions in the capacitive image that correspond with user inputs 140.

Aspects of the present disclosure may utilize multiple capacitive images (e.g., without the use of abscap profiles) to detect user inputs 140, in the presence of interference objects 150, in the sensing region 120. In some embodiments, the processing system 110 may filter one or more contiguous regions identified in a current capacitive image of the sensing region 120 based on a number of previously captured capacitive images for the sensing region 120. In some aspects, the processing system 110 may identify "new" finger touches and/or user inputs in the current capacitive image by comparing the amplitudes of pixels in the contiguous regions of the current capacitive image with the amplitudes of pixels in the contiguous regions of the previously acquired capacitive images. For example, in some aspects, the processing system 110 may detect a "pinch" or "zoom" gesture by comparing the number and location of contiguous regions in the current capacitive image with the number and location of contiguous regions identified in a previously captured capacitive image. Still further, in some aspects, the processing system 110 may eliminate and/or trim contiguous regions associated with interference objects 150, prior to processing user inputs, based on the shapes and/or pixel amplitudes of each contiguous region.

Among other advantages, the embodiments described herein allow for the detection of multiple user inputs 140, in the presence of moisture and/or other interference objects 150, using only transcapacitance sensing techniques. Because the filtering techniques of the present disclosure do not rely upon abscap profiles to filter contiguous regions detected in a transcapacitance image, the filtering techniques may be less computationally intensive than previous filtering techniques and may be implemented by input devices that are not configured for absolute capacitance sensing. Furthermore, the accuracy of the filtering techniques described herein is not limited by the accuracy of abscap profile segmentation. Thus, the present embodiments may be used to detect more than two user inputs 140, in the sensing region 120, even in the presence of one or more interference objects 150. The present embodiments may also achieve better snap distance between two or more user inputs that are brought together in a pinch or zoom gesture (e.g., where snap distance refers to the smallest distance between two touching objects at which they can be resolved as two distinct touching objects).

Figure 2:
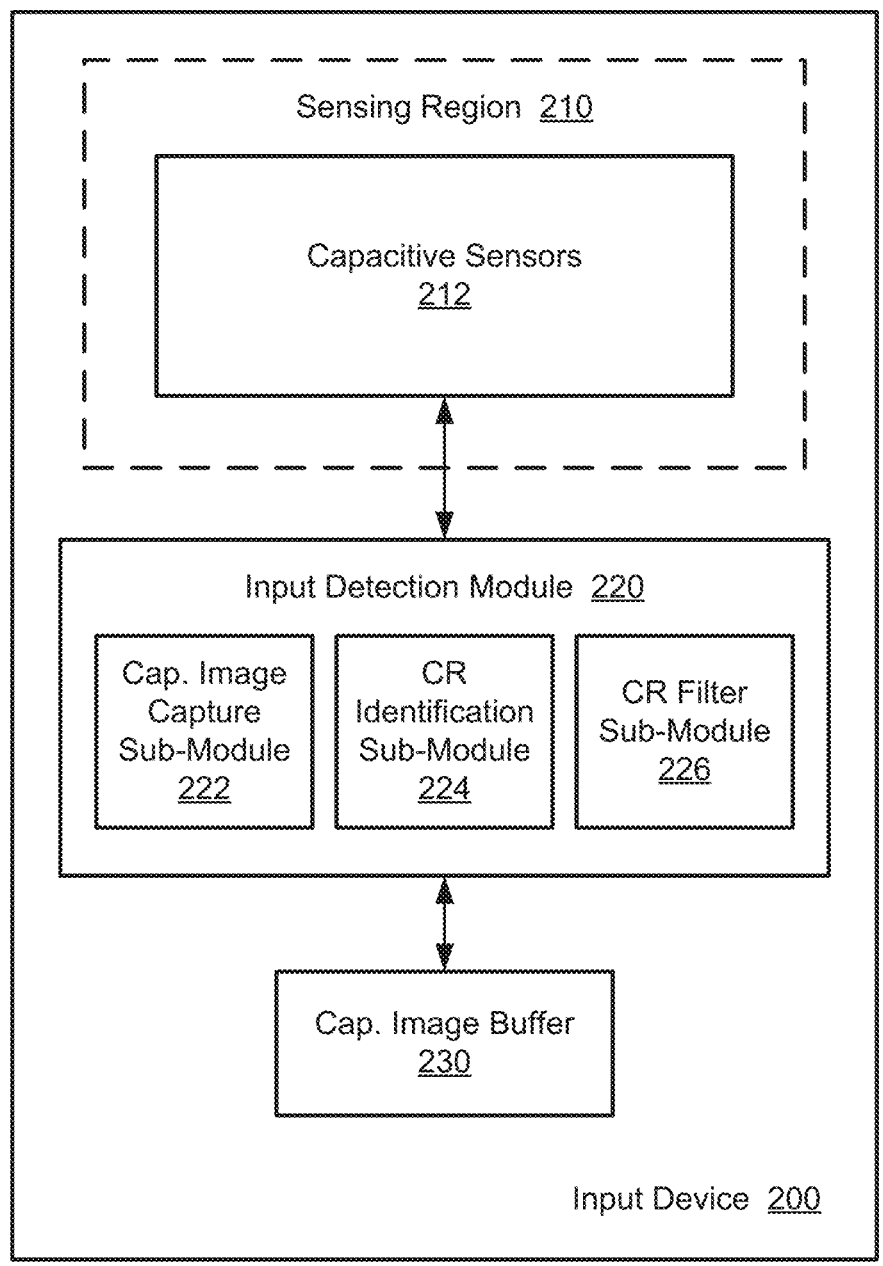
FIG. 2 is a block diagram of an input device capable of filtering multi-touch inputs based on capacitive sensing, in accordance with some embodiments.

FIG. 2 is a block diagram of an input device 200 capable of filtering multi-touch inputs based on capacitive sensing, in accordance with some embodiments. The input device 200 includes a sensing region 210, an input detection module 220, and a capacitive image buffer 230. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some embodiments, the sensing region 210 includes, or is otherwise coupled to, a set of capacitive sensors 212. The capacitive sensors 212 may detect inputs in the sensing region 210 using capacitive sensing technologies (such as described above with respect to FIG. 1). For example, the capacitive sensors 212 may include an array of sensor electrodes that create an electric field in and/or around the sensing region 210. The input device 200 may detect inputs based on changes in capacitance of the sensor electrodes and/or the electric field. In some embodiments, the capacitive sensors 212 are configured for transcapacitance sensing. For example, the capacitive sensors 212 may include a plurality of transmitter sensor electrodes and receiver sensor electrodes, arranged in a grid-like formation, to detect objects in the sensing region 210.

The capacitive sensors 212 are coupled to the input detection module 220. The input detection module 220 may be implemented by, or include at least a portion of, a processing system (such as processing system 110) that controls an operation of the capacitive sensors 212 and/or input device 200. In some embodiments, the input detection module 220 may detect inputs in the sensing region 210 based on sensor information received from the capacitive sensors 212. More specifically, the input detection module 220 may be configured to filter the received sensor information, for example, to distinguish user inputs (such as finger touches) from interference objects (such as moisture) that may be present in the sensing region 210. In some aspects, the input detection module 220 may include a capacitive image capture sub-module 222, a contiguous region (CR) identification sub-module 224, and a contiguous region (CR) filter sub-module 226.

The capacitive image capture sub-module 222 may generate capacitive images of the sensing region 210 based on sensor information received from the capacitive sensors 212.

For example, the sensor information may indicate the capacitance (or change in capacitance) detected at the intersection of each transmitter-receiver pair. The capacitive image capture sub-module 222 may combine or aggregate the sensor information received from each of the capacitive sensors 212 to generate (or "capture") an image of the sensing region 120. More specifically, each "pixel" of the capacitive image may reflect the capacitance (or change in capacitance) detected at a respective intersection between a transmitter sensor electrode and a receiver sensor electrode. The amplitude (or weight) of a particular pixel may depend on the detected capacitance level (or degree of change in capacitance) at a corresponding transmitter-receiver pair.

Figure 3:
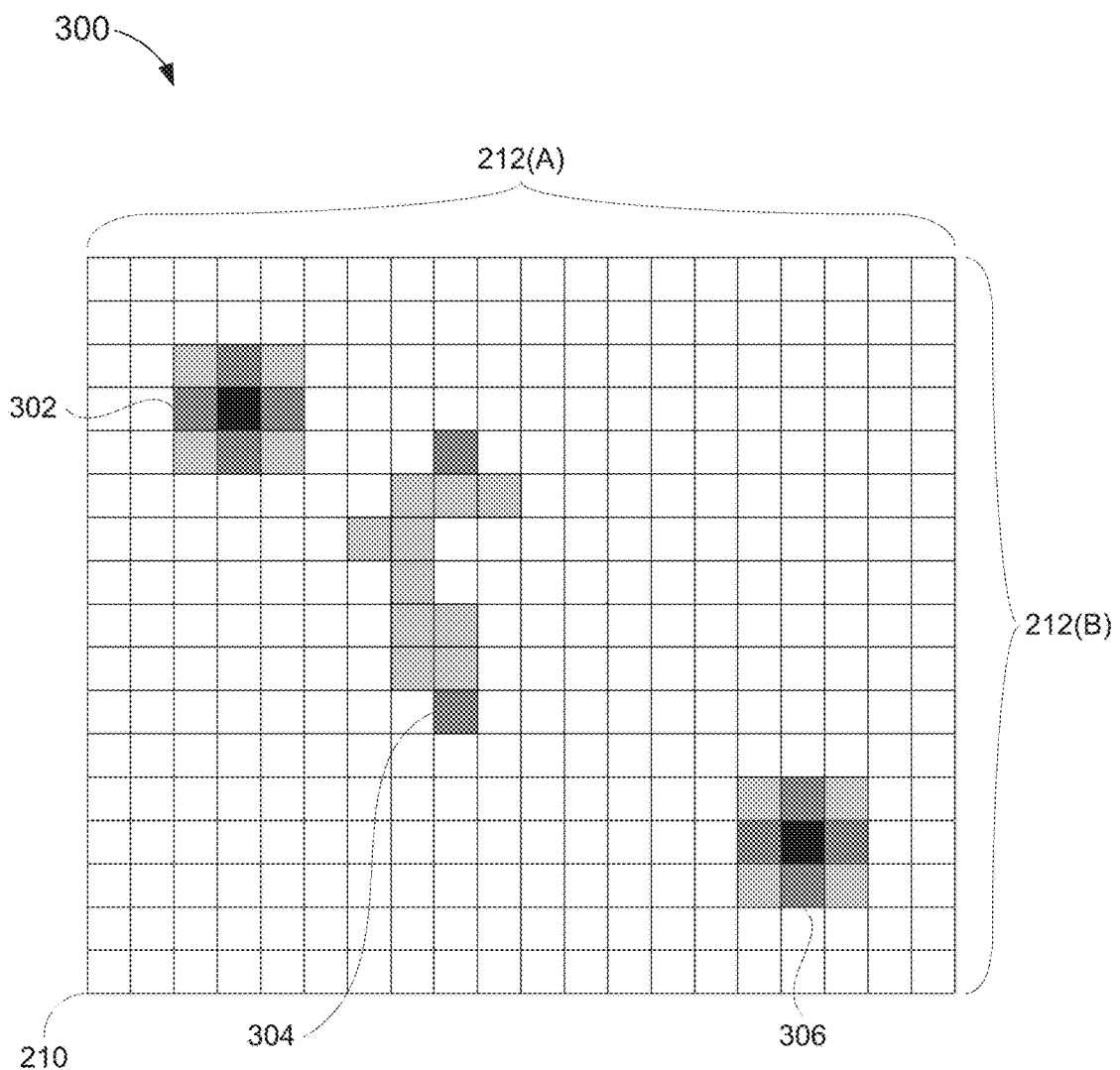
FIG. 3 shows an example capacitive image of a sensing region of an input device.

FIG. 3 shows an example capacitive image 300 that may reflect a current state of the sensing region 210 of the input device 200. The capacitive image capture sub-module 222 may generate the capacitive image 300 based on sensor information received from the capacitive sensors 212 during a scan of the sensing region 210. The capacitive image 300 may reflect the capacitance levels (or changes in capacitance) detected by an array of capacitive sensors 212 arranged in a grid-like formation in the sensing region 210. For example, the array of capacitive sensors 212 may be formed by a first subset of sensor electrodes 212(A) arranged in a vertical pattern and a second subset of sensor electrodes 212(B) arranged in a horizontal pattern.

In some embodiments, the sensor electrodes 212(A) and 212(B) may be arranged on different sides of the same substrate. For example, the sensor electrodes 212(A) and 212(B) may be disposed on one surface of the substrate. In other embodiments, the sensor electrodes 212(A) and 212(B) may be arranged on different substrates. For example, the sensor electrodes 212(A) and 212(B) may be disposed on surfaces of different substrates that are adhered together. In another embodiment, the sensor electrodes 212(A) and 212(B) may be arranged on the same side or surface of a common substrate. For example, the first subset of sensor electrodes 212(A) may include jumpers in regions where the sensor electrodes 212(A) cross over the second subset of sensor electrodes 212(B) (such that the jumpers are insulated from the sensor electrodes 212(B)).

In the example of FIG. 3, the first subset of sensor electrodes 212(A) are shown to extend in a first (e.g., vertical) direction and the second subset of sensor electrodes 212(B) are shown to extend in a second (e.g., horizontal) direction. Although the sensor electrodes 212(A) and 212(B) are depicted in a perpendicular grid arrangement, in actual implementations the sensor electrodes 212(A) and 212(B) may be arranged in other patterns. For example, in other embodiments, the first subset of sensor electrodes 212(A) may be parallel or diagonal to the second subset of sensor electrodes 212(B). Furthermore, each of the sensor electrodes 212(A) and 212(B) is shown to have substantially the same shape and size. However, in other embodiments, the sensor electrodes 212(A) and 212(B) may be of various shapes and/or sizes.

The capacitive image capture sub-module 222 may "scan" the array of sensor electrodes 212 (or sensing region 210) to generate the capacitive image 300. As described above, the sensor electrodes 212 may be configured to implement transcapacitance sensing techniques. For example, in some implementations, the capacitive image capture sub-module 222 may be configured to drive a transmitter signal on the first subset of sensor electrodes 212(A) and receive a resulting signal on the second subset of sensor electrodes 212(B). In other implementations, the capacitive image capture sub-module 222 may be configured to drive a transmitter signal on the second subset of sensor electrodes 212(B) and receive a resulting signal on the first subset of sensor electrodes 212(A).

The capacitive image 300 may represent a "snapshot" of the capacitive couplings in the sensing region 210 at any given time. The intersection of the first subset of sensor electrodes 212(A) and the second subset of sensor electrodes 212(B) form the pixels of the capacitive image 300. More specifically, each "pixel" of the capacitive image 300 may represent an area of localized capacitive coupling between a sensor electrode of the first subset 212(A) and a sensor electrode of the second subset 212(B). The capacitive coupling between any pair of sensor electrodes 212(A) and 212(B) may change with a proximity and/or motion of objects in the sensing region associated with the pair of sensor electrodes 212(A) and 212(B). Thus, the amplitude (or weight) of a particular pixel in the capacitive image 300 may correspond to the capacitance level (or change in capacitance) detected by the receiver sensor electrode associated with that pixel.

The CR identification sub-module 224 may identify one or more contiguous regions in a capacitive image that correspond with objects of interest in the sensing region 210. As described above, a "contiguous region" may represent a number of connected pixels in the capacitive image with amplitudes exceeding a threshold amplitude. For example, a "baseline" may represent a state of the capacitive sensors 212 when no user input is detected. The baseline may be determined at system start-up and/or during one or more sensor calibration procedures. Each of the sensor electrodes 212 may be calibrated differently, and may thus have a different baseline capacitance level. The CR identification sub-module 224 may compare the sensor information received from each of capacitive sensors 212 with a baseline (or threshold) capacitance level for the corresponding sensor electrode to identify one or more contiguous regions. For example, if the amplitude of a particular pixel exceeds the baseline amplitude for that pixel by at least a threshold amount, the CR identification sub-module 224 may identify the pixel as belonging to a contiguous region. In some aspects, the CR identification sub-module 224 may use image segmentation techniques to determine the pixel boundaries of each contiguous region.

For example, with reference to FIG. 3, the CR identification sub-module 224 may identify three distinct contiguous regions 302, 304, and 306 in the transcapacitance image 300. The first contiguous region 302 is formed from a square-shaped cluster of nine pixels in the upper-left portion of the sensing region 210. The center-most pixel of the first contiguous region 302 has the highest amplitude (e.g., as indicated by the dark shading), the pixels directly adjacent the center-most pixel have slightly lower amplitudes (e.g., as indicated by the medium-dark shading), and the pixels at the corners of the first contiguous region 302 have the lowest amplitudes (e.g., as indicated by the light shading). Using image segmentation and/or other heuristics, the CR identification sub-module 224 may determine that the boundaries of the first contiguous region 302 do not extend beyond the nine pixels shown in FIG. 3.

The second contiguous region 304 is formed from a cluster of twelve pixels closer towards the center of the sensing region 210. The upper- and lower-most pixels of the first contiguous region 304 have the slightly higher amplitudes (e.g., as indicated by the medium-dark shading) than the rest of the pixels in the contiguous region (e.g., as indicated by the light shading). Although the second contiguous region 304 does not have a well-defined shape, the CR identification sub-module 224 may determine (e.g., using image segmentation and/or other heuristics) that the boundaries of the second contiguous region 304 do not extend beyond the twelve pixels shown in FIG. 3.

The third contiguous region 306 is formed from a square-shaped cluster of nine pixels in the lower-right portion of the sensing region 210. The center-most pixel of the third contiguous region 306 has the highest amplitude (e.g., as indicated by the dark shading), the pixels directly adjacent the center-most pixel have slightly lower amplitudes (e.g., as indicated by the medium-dark shading), and the pixels at the corners of the third contiguous region 306 have the lowest amplitudes (e.g., as indicated by the light shading). Using image segmentation and/or other heuristics, the CR identification sub-module 224 may determine that the boundaries of the third contiguous region 306 do not extend beyond the nine pixels shown in FIG. 3.

In the example of FIG. 3, each of the first contiguous region 302 and the third contiguous region 306 may correspond with a user's finger touching the sensing region 210. In contrast, the second contiguous region 304 may correspond with moisture or water (e.g., or other interference object) present in the sensing region 210. Without proper filtering, the second contiguous region 304 may cause the input device 200 to detect "ghost" inputs and/or fail to detect one or more actual user inputs. For example, without proper filtering, all three contiguous regions 302, 304, and 306 may be passed on to a processing system (not shown for simplicity) for further processing. If the processing system is capable of processing three or more simultaneous inputs, the processing system may treat the contiguous regions 302, 304, and 306 as three distinct user inputs. If the processing system is capable of processing only two (or fewer) simultaneous inputs, the processing system may treat two of the contiguous regions (e.g., the first contiguous region 302 and the second contiguous region 304) as user inputs, while ignoring the last contiguous region (e.g., the third contiguous region 306).

The CR filter sub-module 226 may filter the contiguous regions identified in a capacitive image to prevent any contiguous regions associated with interference objects in the sensing region 210 from being processed as user inputs. In some embodiments, the CR filter sub-module 226 may filter one or more contiguous regions identified in a current capacitive image based, at least in part, on a number of capacitive images previously generated for the sensing region 210. For example, each time the capacitive image capture sub-module 222 generates a capacitive image of the sensing region 210, the input detection module 220 may store the image in the capacitive image buffer 230. In some embodiments, the capacitive image buffer 230 may be a circular buffer or other form of storage device that is configured to store a limited number of prior capacitive images (such as the last 5 images). For example, the capacitive buffer 230 may discard the oldest capacitive image each time a new capacitive image is captured and stored in the buffer 230.

In some embodiments, the CR filter sub-module 226 may determine whether any of the identified contiguous regions 302, 304, or 36 in the current capacitive image 300 corresponds with a "new" user input based on the previously capacitive images stored in the capacitive image buffer 230. For example, a new user input may correspond with an object (e.g., finger) that was recently brought in contact with the sensing region 210. It is noted that a new user input should not show up as a contiguous region in any previous capacitive images. Thus, in some embodiments, the CR filter sub-module 226 may compare the current capacitive image with one or more previous capacitive images stored in the capacitive image buffer 230. For example, in some aspects, the CR filter sub-module 226 may generate a "mean" capacitive image that shows the average pixel values of the sensing region 210 based on (e.g., averaged across) the previous capacitive images stored in the capacitive image buffer 230. The CR filter sub-module 226 may subtract the pixel values of the previous (or mean) capacitive image from the pixel values of the current capacitive image to identify contiguous regions that are new or unique in the current capacitive image. The CR filter sub-module 226 may then determine whether to attribute any new contiguous regions to one or more new user inputs.

Figure 4:
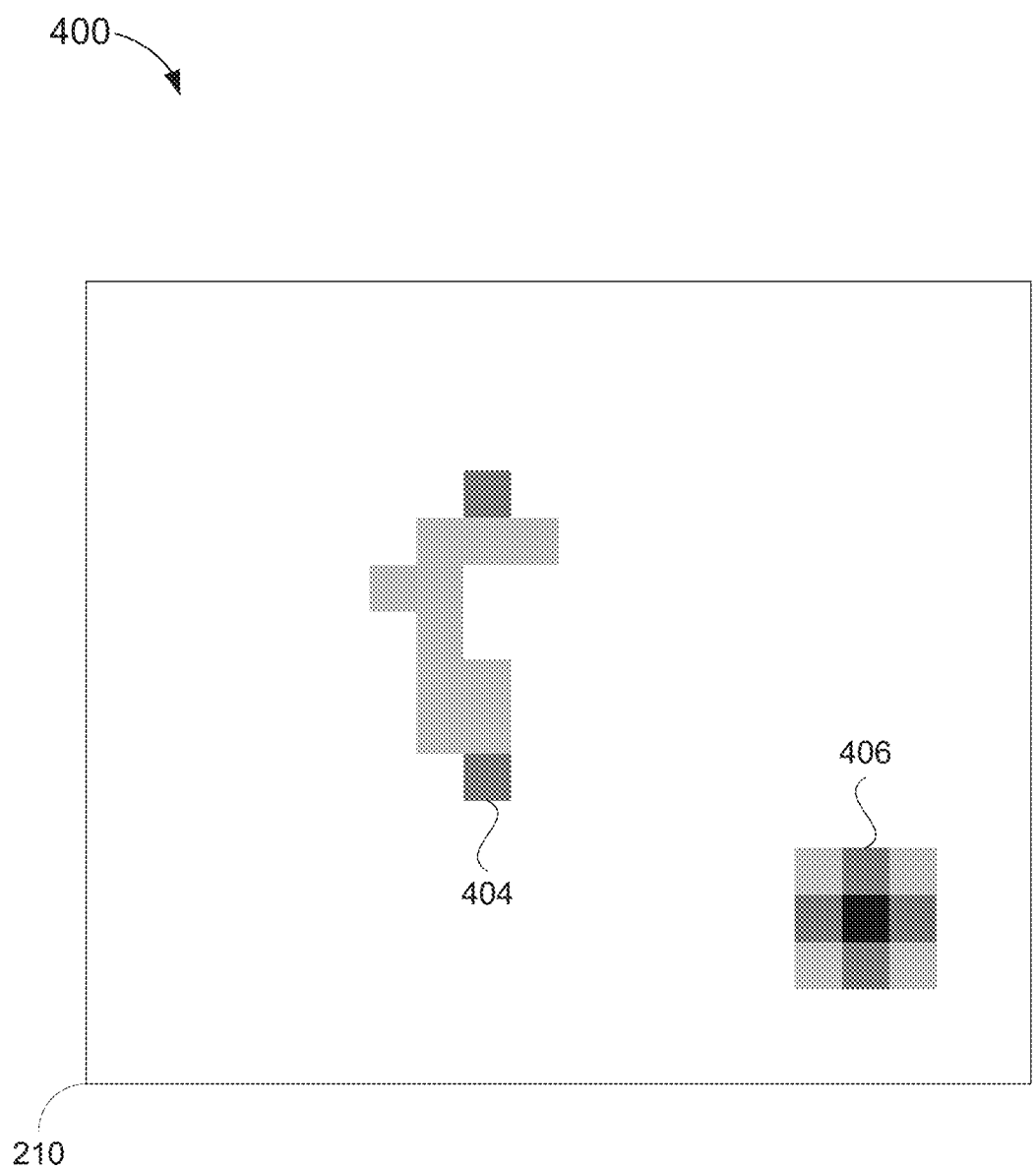
FIG. 4 shows an example previous capacitive image of the sensing region depicted in FIG. 3.

FIG. 4 shows an example previous capacitive image 400 of the sensing region 210. In some embodiments, the previous capacitive image 400 may be based on one or more previously-generated capacitive images for the sensing region (e.g., as stored in the capacitive image buffer 230). In some aspects, the previous capacitive image 400 may reflect the average capacitance levels (or changes in capacitance) detected by the array of capacitive sensors 212 over a number of previous scan cycles. More specifically, each pixel of the previous capacitive image 400 may represent the average capacitive coupling between an associated pair of sensor electrodes 212(A) and 212(B) (not shown in FIG. 4, for simplicity). Thus, the amplitude (or weight) of a particular pixel in the previous capacitive image 400 may correspond to the average capacitance level detected by the receiver sensor electrode associated with the pixel across a number of scans.

In the example of FIG. 4, the previous capacitive image 400 shows only two contiguous regions 404 and 406 in the sensing region 210. For example, the contiguous regions 404 and 406 of the previous capacitive image 400 may correspond with contiguous regions 304 and 306, respectively, of the current capacitive image 300. In some embodiments, the CR filter sub-module 226 may subtract the pixel values of the previous capacitive image 400 from the pixel values of the current capacitive image 300 to produce a "delta image." The resulting delta image may be interpreted as a "heat map" highlighting the differences between the current capacitive image 300 and the previous capacitive image 400. In some embodiments, the CR filter sub-module 226 may further determine, based on the delta image, whether to attribute any newly-identified contiguous regions in the current capacitive image 300 to a new user input.

Figure 5:
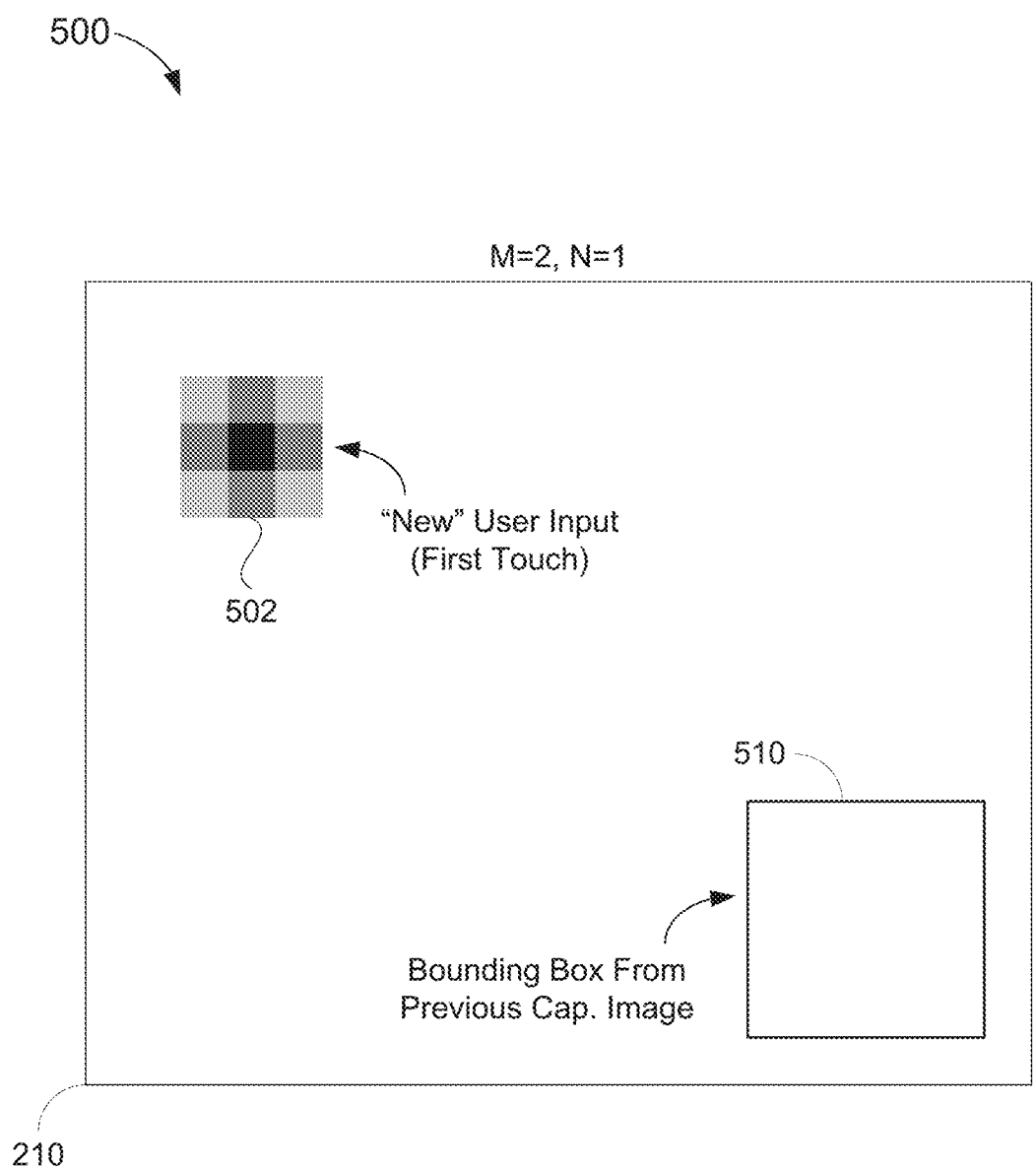
FIG. 5 shows an example delta image of the sensing region depicted in FIG. 3.

FIG. 5 shows an example delta image 500 of the sensing region 210. The CR filter sub-module 226 may generate the delta image 500 by subtracting (e.g., comparing and/or taking the difference of) the pixel values of the previous capacitive image 400 from the pixel values of the current capacitive image 300. Thus, the delta image 500 may highlight any changes in pixel amplitudes between the current capacitive image 300 and the mean capacitive image 400. Newly-identified contiguous regions may appear with relatively high amplitudes in the delta image 500, whereas more persistent contiguous regions may appear with substantially lower amplitudes (or may not appear at all, depending on the level of persistence) in the delta image 500.

In the example of FIG. 5, the delta image 500 shows only one "newly-identified" contiguous region 502 in the sensing region 210. For example, contiguous region 502 of the delta image 500 may correspond with contiguous region 302 of the current capacitive image 300. Thus, the CR filter sub-module 226 may determine that only the first contiguous region 302 is new or unique to the current capacitive image 300. The CR filter sub-module 226 may then determine, based on a number (N) of previously-detected user inputs and a maximum number (M) of concurrent inputs detectable by the input device 200, whether to attribute the newly-identified contiguous region 502 to a new user input.

In the present example, the input device 200 may be capable of detecting a maximum of two concurrent user inputs (M=2) in the sensing region 210. Furthermore, the CR filter sub-module 226 may determine that one previous user input (N=1) has already been detected in the sensing region 210. In some embodiments, the CR filter sub-module 226 may determine the number of previously-detected user inputs based on a number of "bounding boxes" associated with a prior capacitive image. As described in greater detail below, each bounding box may represent a boundary and/or search space for a particular user input detected in a previous iteration of the contiguous region filtering process. For example, the bounding box may be used to prevent a moving user input (such as a pinching or swiping gesture) from being registered as a "new" user input each time the input moves to a new location in the sensing region 210.

In some embodiments, the CR filter sub-module 226 may attribute a newly-identified contiguous region to a new user input only if the contiguous region does not overlap any bounding boxes from the previous capacitive image and the number of previously-detected user inputs is less than the maximum number of supported inputs (e.g., N<M). However, if one or more pixels of a newly-identified contiguous region fall within a bounding box from the previous capacitive image and/or the maximum number of supported inputs have already been detected (e.g., N=M), then the CR filter sub-module 226 may "merge" the newly-identified contiguous region with another contiguous region in the current capacitive image 300. For example, two or more contiguous regions may be merged together by treating their combined pixels as a single contiguous region. In some embodiments, the CR identification sub-module 224 (or the CR filter sub-module 226) may determine the position of a user input within the combined contiguous region based at least in part on the delta image 500. For example, the user input may coincide with a set of one or more pixels having the highest amplitudes, among the pixel values of the combined contiguous region, in the delta image 500.

In the example of FIG. 5, the CR filter sub-module 226 may identify only one bounding box 510 associated with the previous capacitive image. Accordingly, the CR filter sub-module 226 may determine that there is also only one previously-detected user input (N=1) from the previous capacitive image. Since the newly-identified contiguous region 502 does not overlap the bounding box 510, and the number of previously-detected user inputs is less than the maximum number of supported inputs (e.g., N<M), the CR filter sub-module 226 may attribute the newly-identified contiguous region 502 to a new user input. For example, the newly-identified contiguous region 502 may correspond to the first time a user's finger has landed in the sensing region 210.

After determining whether the current capacitive image 300 contains any new user inputs, the CR filter sub-module 226 may proceed to filter the contiguous regions of the current capacitive image 300. In some embodiments, the CR filter sub-module 226 may first construct bounding boxes around the contiguous regions of the current capacitive image 300. The number of bounding boxes may be limited by the maximum number of inputs that the input device 200 is configured to support. Thus, the CR filter sub-module 226 may construct, at most, two bounding boxes around the contiguous regions 302, 304, and 306 of the current capacitive image 300. However, since there are three contiguous regions 302, 304, and 306, and only two possible bounding boxes, the contiguous region filter sub-module may construct at least one of the bounding boxes to encompass two of the contiguous regions.

Figure 6A:
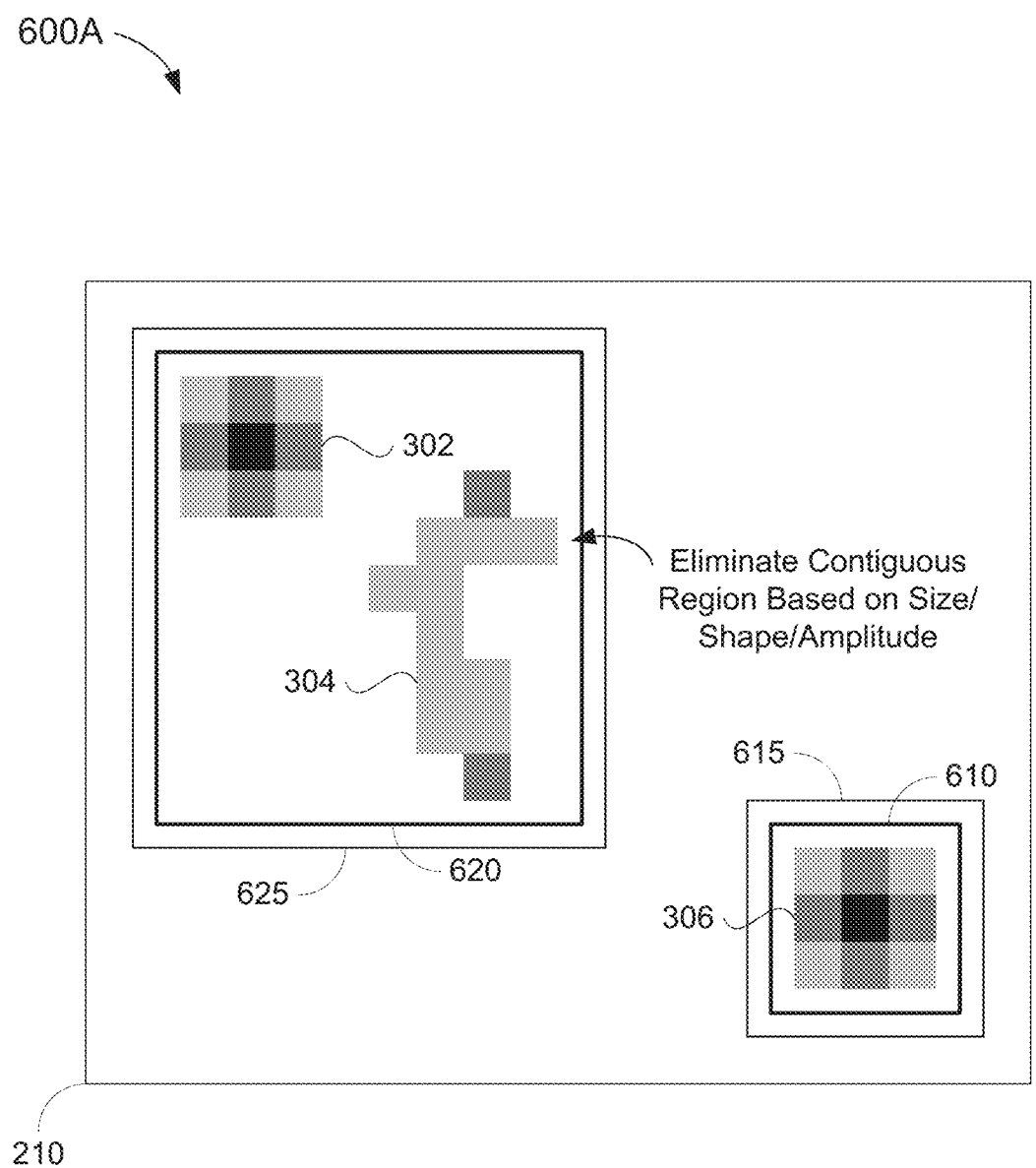
FIGS. 6A and 6B show an example contiguous region filtering process performed on the capacitive image of FIG. 3.

With reference to the example filtering step 600A depicted in FIG. 6A, the CR filter sub-module 226 may construct a first bounding box 610 around the third contiguous region 306 and a second bounding box 620 around the first contiguous region 302 and second contiguous region 304. The bounding boxes 610 and 620 are constructed such that each pixel of the third contiguous region 306 is bounded by (e.g., located within) the first bounding box 610 and each pixel of the first contiguous region 302 and second contiguous region 304 is bounded by the second bounding box 620. In some embodiments, the CR filter sub-module 226 may further "dilate" the bounding boxes 610 and 620, for example, by expanding their boundaries to account for possible movements by the contiguous regions bounded therein. For example, a first dilated bounding box 615 may represent a "search space" for the third contiguous region 306, and a second dilated bounding box 625 may represent a search space for each of the first contiguous region 302 and the second contiguous region 304.

Thus, if the third contiguous region 306 moves to a new location between the current capacitive image and a subsequent capacitive image, the CR filter sub-module 226 will not treat the third contiguous region 306 as a newly-identified contiguous region in the subsequent capacitive image as long as one or more pixels of the third contiguous region 306 reside within the boundaries of the first dilated bounding box 615 (e.g., as described above with respect to FIG. 5). Similarly, if the first contiguous region 302 moves to a new location between the current capacitive image and a subsequent capacitive image, the CR filter sub-module 226 will not treat the first contiguous region 302 as a newly-identified contiguous region in the subsequent capacitive as long as one or more pixels of the first contiguous region 302 reside within the boundaries of the second dilated bounding box 625.

Finally, the CR filter sub-module 226 may use heuristics to eliminate and/or trim the contiguous regions in the current capacitive image 300. In some embodiments, the CR filter sub-module 226 may filter the contiguous regions 302, 304, and 306 so that there remains at most one contiguous region in each of the bounding boxes 610 and 620. For example, the CR filter sub-module 226 may analyze the shape and pixel amplitudes of each contiguous region to determine whether a particular contiguous region is more likely to correspond to a user input (such as a finger touch) or an interference object (such as moisture). As used herein, the term "valid input" may refer to a contiguous region that is more likely to correspond to a user input than an interference object (e.g., based on the heuristic analysis). In some embodiments, the CR filter sub-module 226 may filter or eliminate any contiguous regions that do not correspond to valid inputs. In some other embodiments, the CR identification sub-module 224 (or the CR filter sub-module 226) may determine the location of pixels corresponding to a valid input based at least in part on the delta image 500. For example, a valid input may coincide with a set of one or more pixels having the highest amplitudes in the delta image 500. If there is more than one contiguous region in a particular bounding box, the CR filter sub-module 226 may keep only the contiguous region that most closely fits the heuristic model of a user input (e.g., and eliminate the remaining contiguous regions). As a final step, the CR filter sub-module 226 may eliminate any bounding boxes that do not contain contiguous regions after the trimming and/or elimination of contiguous regions.

In the example of FIG. 6A, only one contiguous region (e.g., the third contiguous region 306) is bounded by the first bounding box 610. Thus, the CR filter sub-module 226 may pass on the third contiguous region 306 (e.g., to a processing system) for further processing. However, two contiguous regions (e.g., the first contiguous region 302 and the second contiguous region 304) are bounded by the second bounding box 620. Thus, the CR filter sub-module 226 may determine which of the two contiguous regions 302 or 304 is most likely attributable to a user input. In the present example, the CR filter sub-module 226 may determine that the first contiguous region 302 more closely fits the heuristic model of a user input than the second contiguous region 304. For example, the CR filter sub-module 226 may determine that the second contiguous region 304 does not correspond to a valid input. Accordingly, the CR filter sub-module 226 may eliminate the second contiguous region 304, and pass on the first contiguous region 302 for further processing.

Figure 6B:
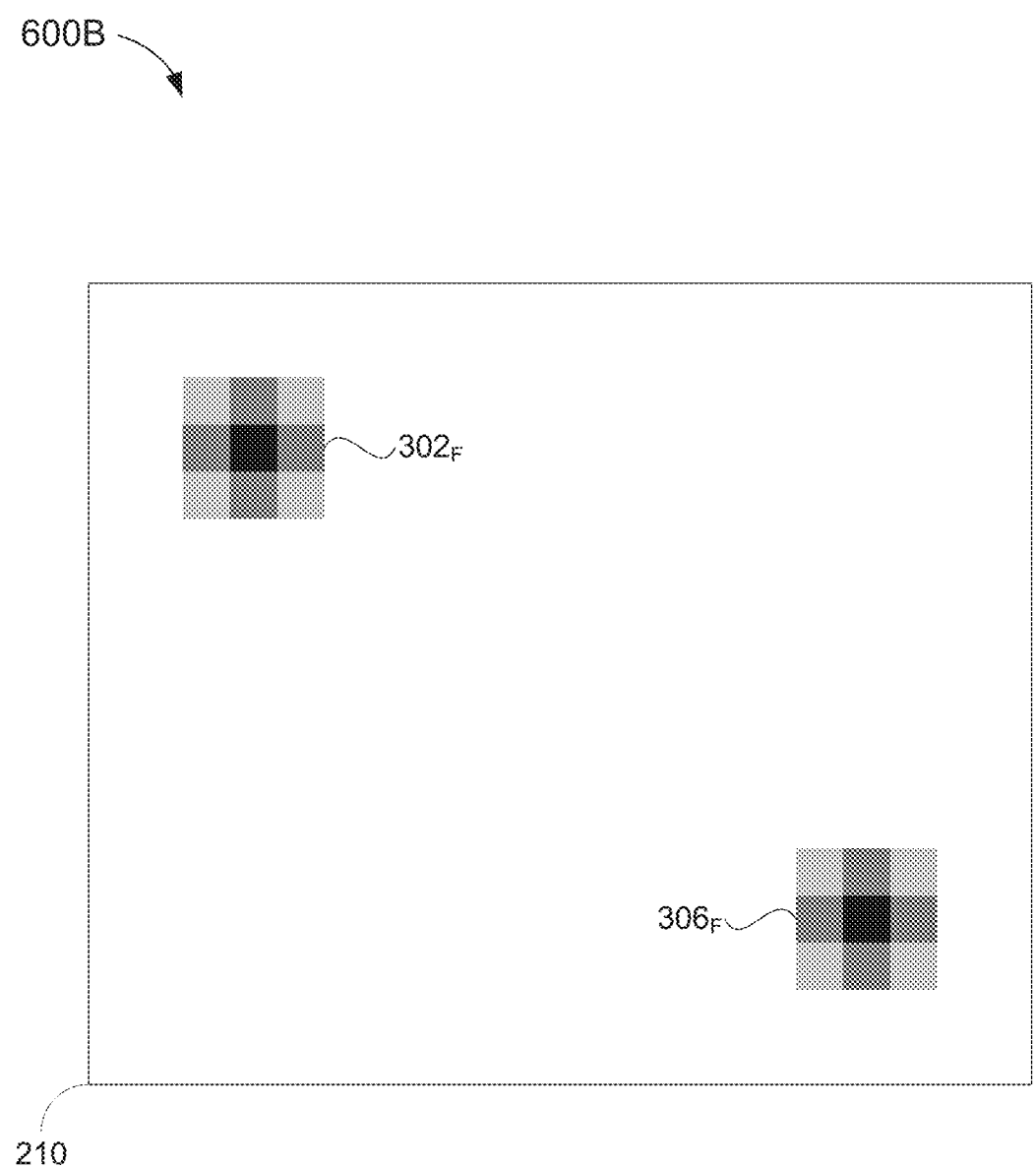

With reference to the example filtering step 600B depicted in FIG. 6B, only contiguous regions 302 and 306 remain after the current iteration of the filtering process. Accordingly, contiguous regions 302 and 306 may be passed on to a processing system (e.g., as "filtered" contiguous regions 302F and 306F, respectively) to be processed as user inputs.

Figure 7A:
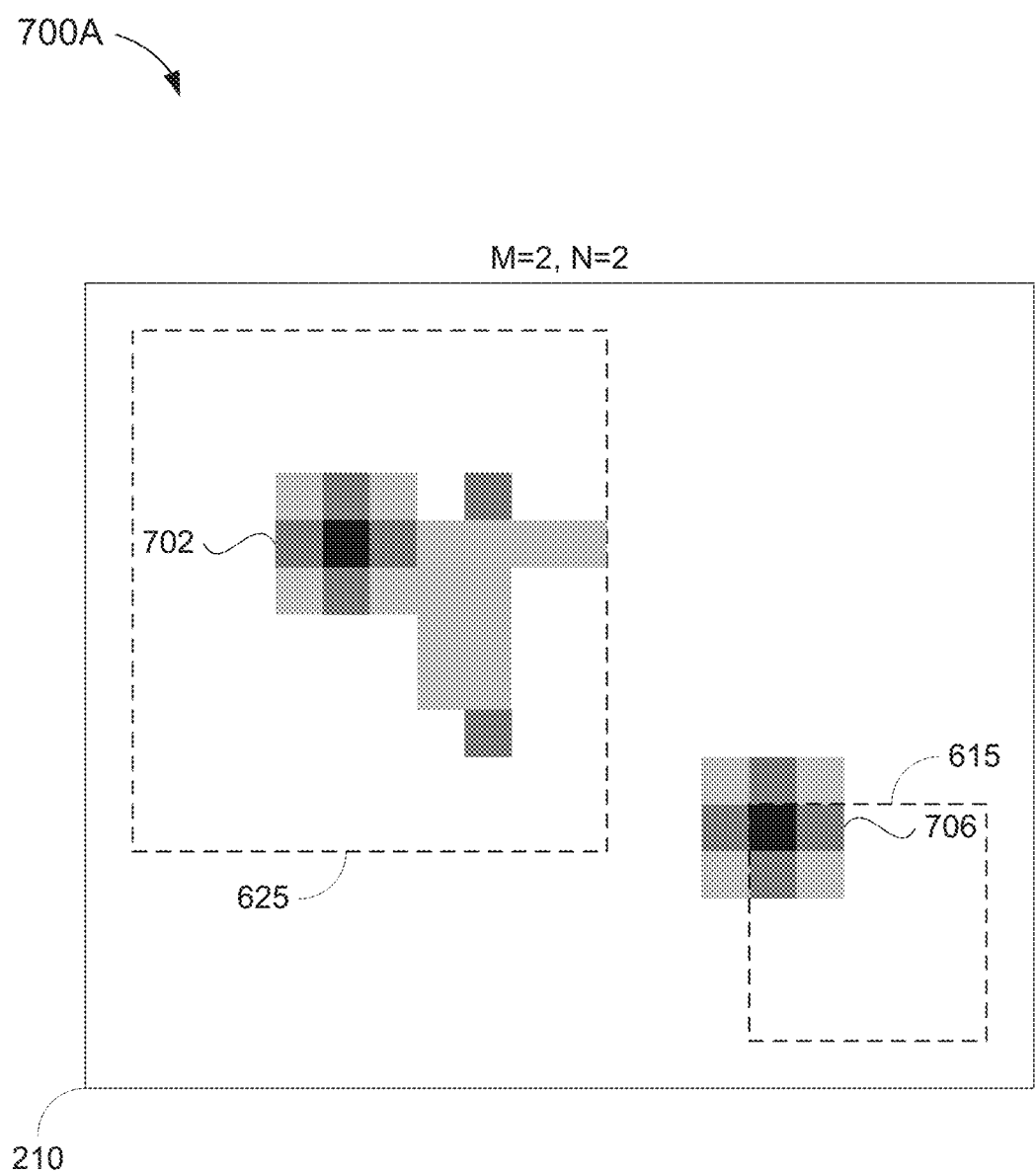
FIG. 7A shows an example capacitive image captured after the capacitive image depicted in FIG. 3.

FIG. 7A shows an example capacitive image 700A captured after the capacitive image 300 depicted in FIG. 3. The capacitive image capture sub-module 222 may generate the capacitive image 700A based on sensor information received from the capacitive sensors 212 during a scan of the sensing region (e.g., subsequent to the scan performed in FIG. 3).

The CR identification sub-module 224 may identify two distinct contiguous regions 702 and 706 in the capacitive image 700A. For example, the contiguous regions 702 and 706 may track the movements of the user's fingers as they pinch together in the sensing region 210. The first contiguous region 702 may reflect one of the user's fingers interacting with moisture in the sensing region 210. Thus, the first contiguous region 702 may be formed by the union of the first contiguous region 302 and the second contiguous region 304 of FIG. 3. For example, the first contiguous region includes a square-shaped cluster of nine pixels (e.g., corresponding to the first contiguous region 302) and an adjoining cluster of 12 pixels (e.g., corresponding to the second contiguous region 304) in the upper-left portion of the sensing region 210. The second contiguous region 706 includes a square-shaped cluster of 9 pixels (e.g., corresponding to the third contiguous region 306) in the lower-right portion of the sensing region 210.

In the example of FIG. 7A, the first contiguous region 702 is within the second dilated bounding box 625 associated with the previous capacitive image 300, and the second contiguous region 706 overlaps the first dilated bounding box 615 associated with the previous capacitive image 300. Furthermore, the maximum number of supported inputs have already been detected (e.g., N=M=2). Thus, the CR filter sub-module 226 may determine that there are no new user inputs detected in the current capacitive image 700A. The CR filter sub-module 226 may then proceed to filter the contiguous regions 702 and 706 of the current capacitive image 700A. As described above, the CR filter sub-module 226 may construct, at most, two bounding boxes around the contiguous regions 702 and 706.

Figure 7B:
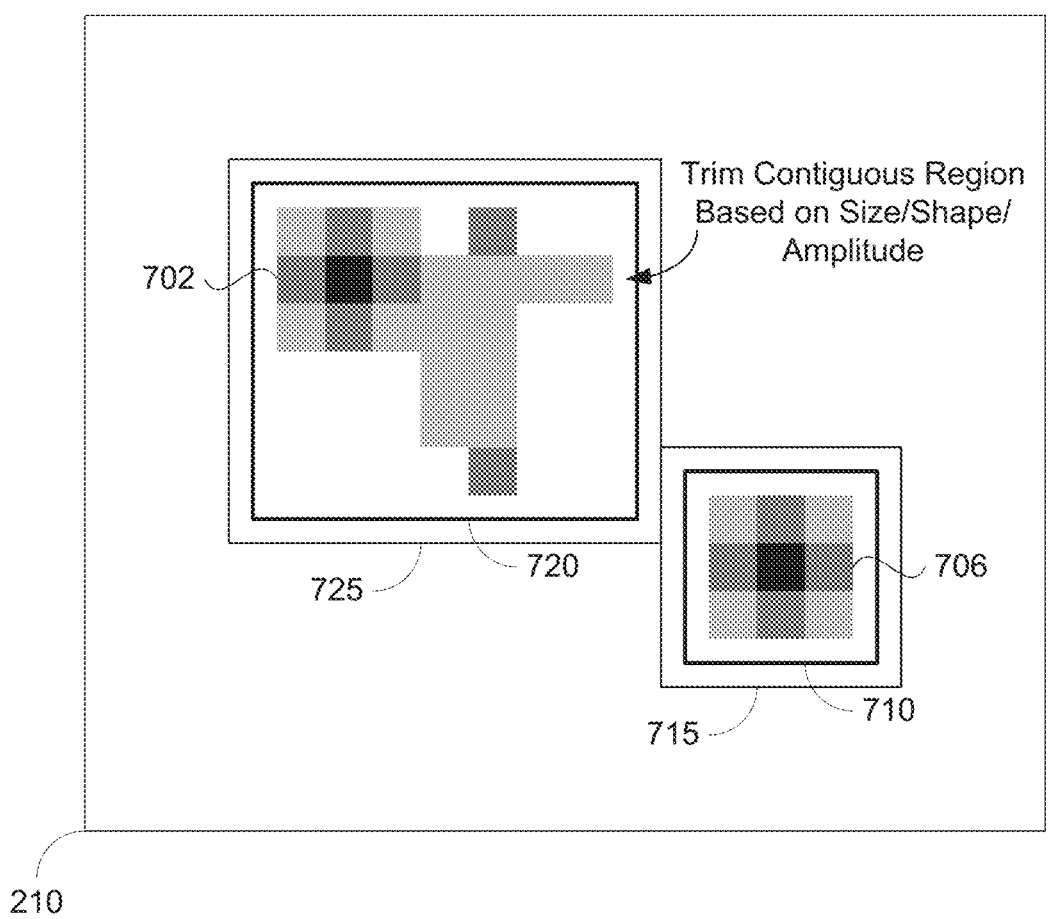
FIGS. 7B and 7C show an example contiguous region filtering process performed on the capacitive image of FIG. 7A.

With reference to the example filtering step 700B depicted in FIG. 7B, the CR filter sub-module 226 may construct a first bounding box 710 around the second contiguous region 706 and a second bounding box 720 around the first contiguous region 702. In some embodiments, the CR filter sub-module 226 may further dilate the bounding boxes 710 and 720 to account for possible movements by the contiguous regions bounded therein. For example, a first dilated bounding box 715 may represent a future search space for the second contiguous region 706 and a second dilated bounding box 725 may represent a future search space for the first contiguous region 702.

Finally, the CR filter sub-module 226 may use heuristics to eliminate and/or trim the contiguous regions in the current capacitive image 700A. Since there is already a one-to-one pairing of contiguous regions to bounding boxes, there is no need to eliminate any contiguous regions from the current capacitive image 700A. In some embodiments, the CR filter sub-module 226 may trim the first contiguous region 702 so that it more accurately reflects a finger touch input without the presence of moisture. For example, the CR filter sub-module 226 may analyze the shape and/or pixel amplitudes of the first contiguous region 702 to determine what portion of the contiguous region 702 is most likely to coincide with a user's finger, stylus, or other input device. In some aspects, the user input may coincide with the pixel(s) having the highest amplitudes in a corresponding delta image (e.g., obtained by subtracting one or more previously captured capacitive images from the current capacitive image 700A), such as described above with respect to FIG. 6A. From there, the CR filter sub-module 226 may perform a breadth-first search to determine the likely pixel boundary of each user input (e.g., corresponding to the square cluster of pixels centered around the pixel with the highest amplitude). Any pixels lying outside the boundary of each user input (e.g., the twelve pixels to the right of the square cluster) may be trimmed or eliminated before passing the first contiguous region 702 on for further processing.

Figure 7C:
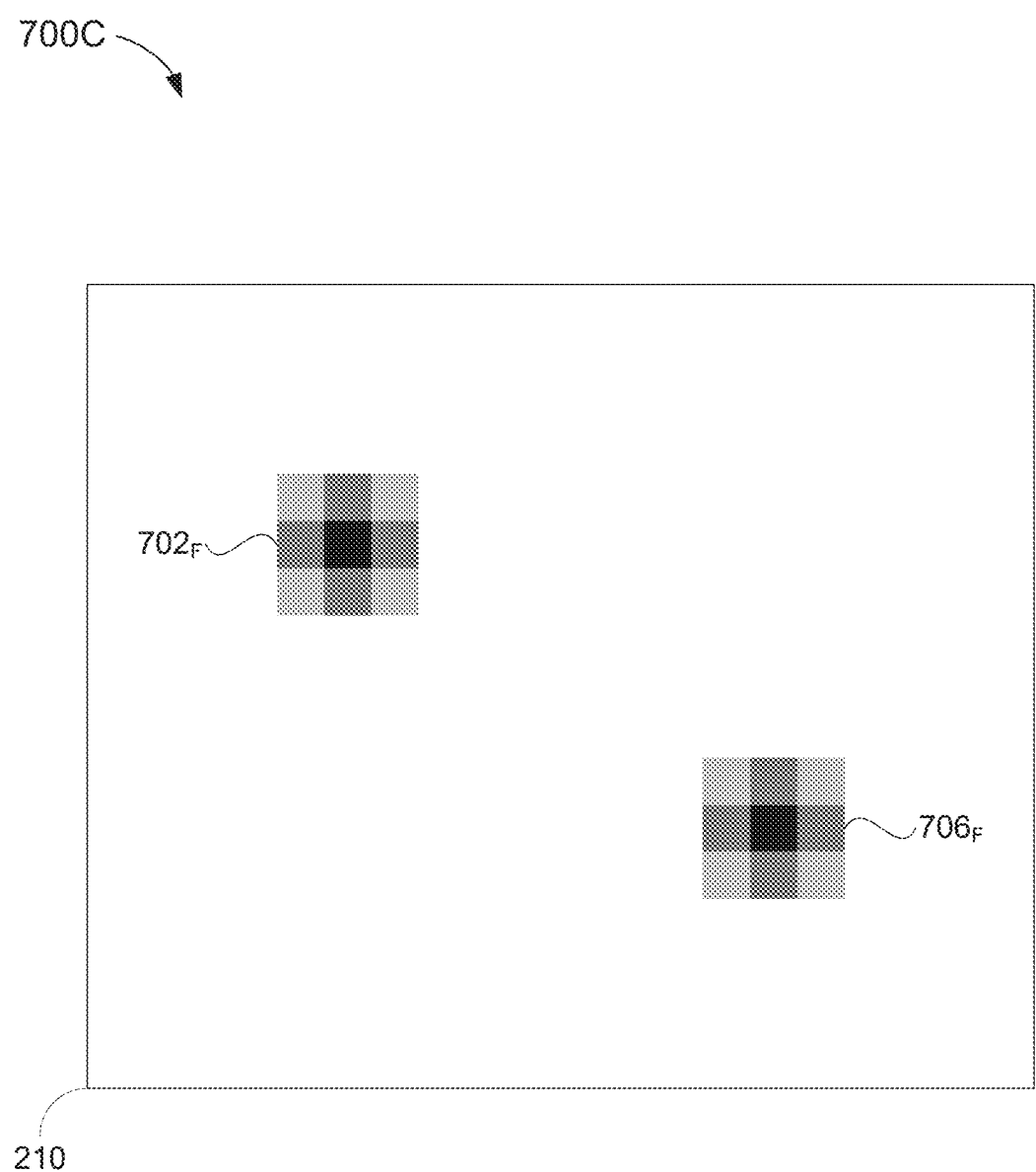

With reference to the example filtering step 700C depicted in FIG. 7C, only contiguous regions 702 (as trimmed) and 706 remain after the current iteration of the filtering process. Accordingly, contiguous regions 702 and 706 may be passed on to a processing system (e.g., as filtered contiguous regions 702F and 706F, respectively) to be processed as user inputs.

Figure 8A:
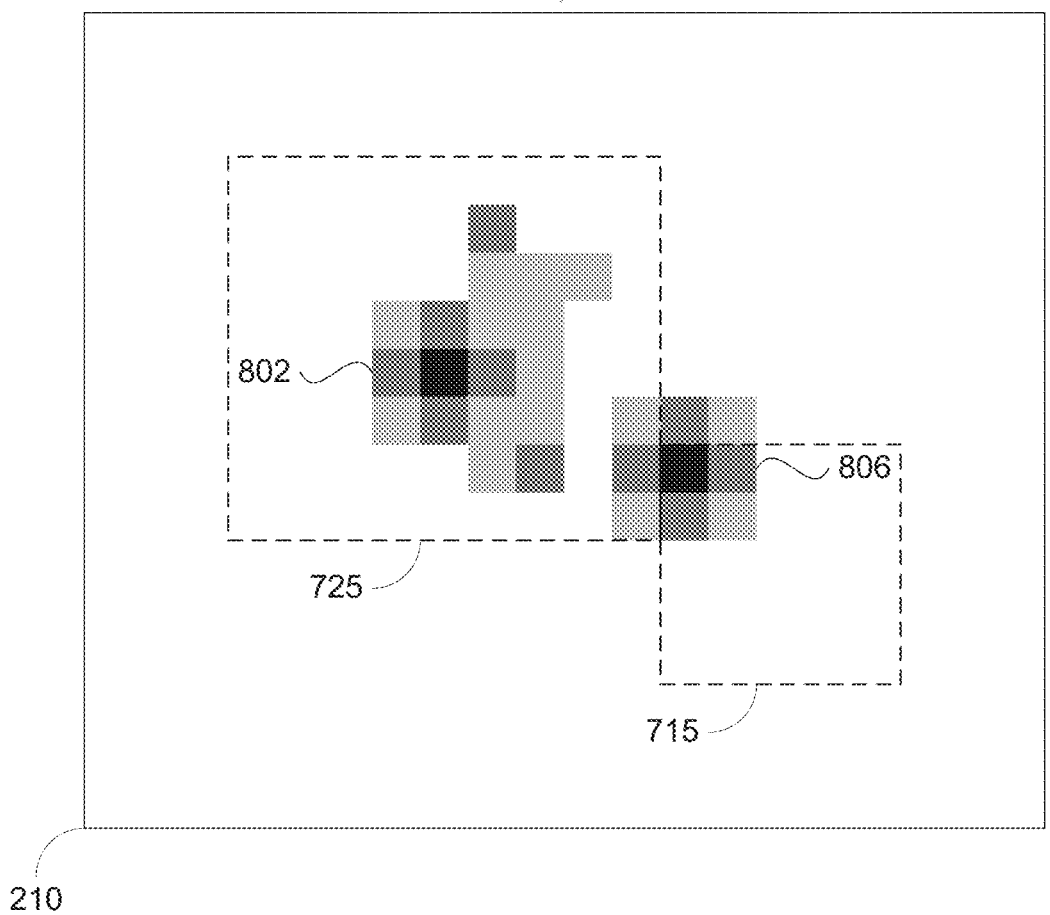
FIG. 8A shows an example capacitive image captured after the capacitive image depicted in FIG. 7A.

FIG. 8A shows an example capacitive image 800A captured after the capacitive image 700A depicted in FIG. 7A. The capacitive image capture sub-module 222 may generate the capacitive image 800A based on sensor information received from the capacitive sensors 212 during a scan of the sensing region (e.g., subsequent to the scan performed in FIG. 7A).

The CR identification sub-module 224 may identify two distinct contiguous regions 802 and 806 in the capacitive image 800A. For example, the contiguous regions 802 and 806 may further track the movements of the user's fingers as they pinch together in the sensing region 210. The first contiguous region 802 may reflect a further interaction of the user's finger with moisture in the sensing region 210. Thus, the first contiguous region may include a square-shaped cluster of nine pixels (e.g., corresponding to the first contiguous region 302) and a surrounding cluster of 9 pixels (e.g., corresponding to the second contiguous region 304) in the upper-left portion of the sensing region 210. The second contiguous region 806 includes a square-shaped cluster of 9 pixels (e.g., corresponding to the third contiguous region 306) in the lower-right portion of the sensing region 210.

In the example of FIG. 8A, the first contiguous region 802 is within the second dilated bounding box 725 associated with the previous capacitive image 700A, and the second contiguous region 806 overlaps both the first and second dilated bounding boxes 715 and 725 associated with the previous capacitive image 700A. Furthermore, the maximum number of supported inputs have already been detected (e.g., N=M=2). Thus, the CR filter sub-module 226 may determine that there are no new user inputs detected in the current capacitive image 800A. The CR filter sub-module 226 may then proceed to filter the contiguous regions 802 and 806 of the current capacitive image 800A. As described above, the CR filter sub-module 226 may construct, at most two bounding boxes around the contiguous regions 802 and 806.

Figure 8B:
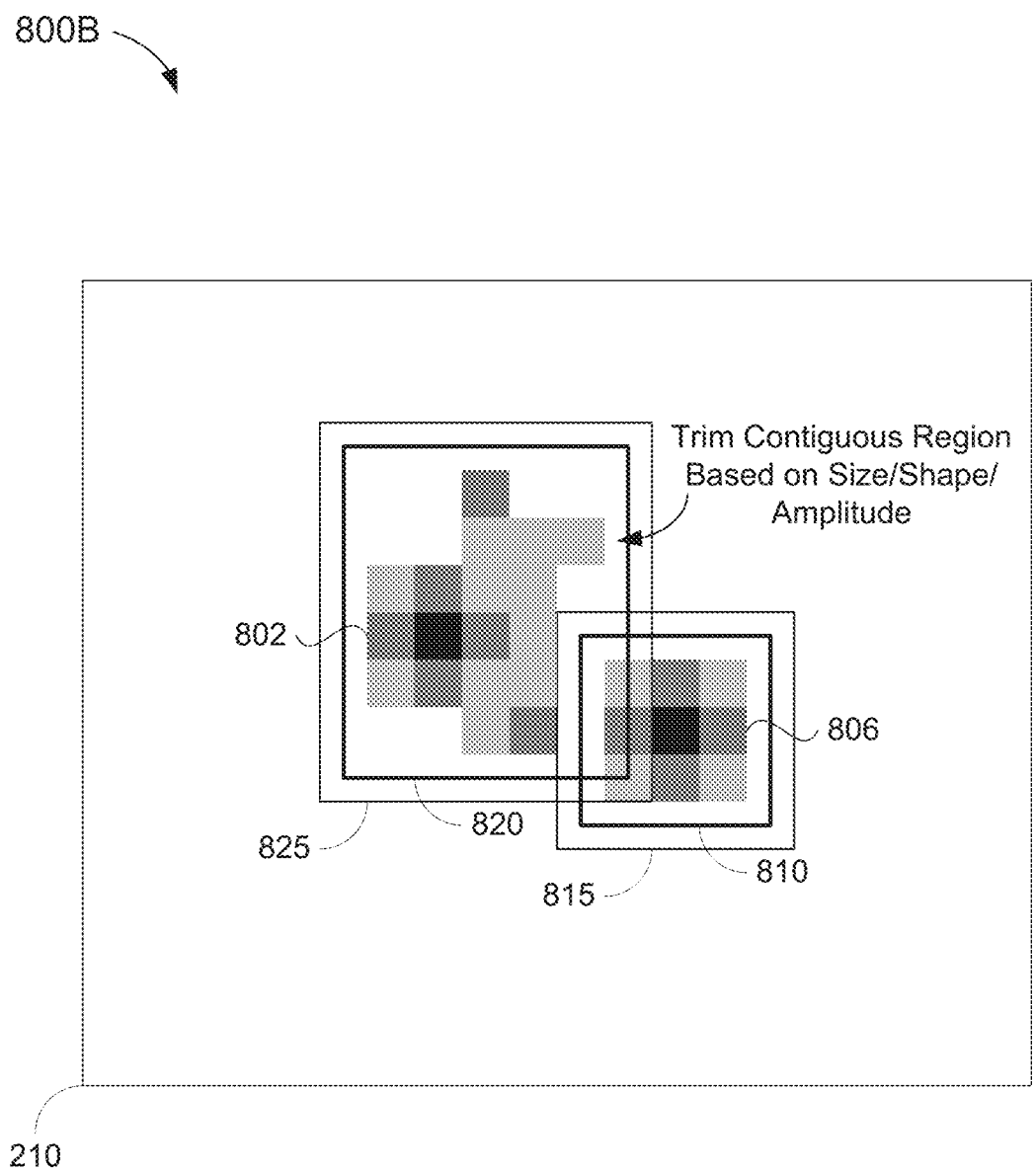
FIGS. 8B and 8C show an example contiguous region filtering process performed on the capacitive image of FIG. 8A.

With reference to the example filtering step 800B depicted in FIG. 8B, the CR filter sub-module 226 may construct a first bounding box 810 around the second contiguous region 806 and a second bounding box 820 around the first contiguous region 802. In some embodiments, the CR filter sub-module 226 may further dilate the bounding boxes 810 and 820 to account for possible movements by the contiguous regions bounded therein. For example, a first dilated bounding box 815 may represent a future search space for the second contiguous region 806 and a second dilated bounding box 825 may represent a future search space for the first contiguous region 802.

Finally, the CR filter sub-module 226 may use heuristics to eliminate and/or trim the contiguous regions in the current capacitive image 800A. In the example of FIG. 8B, the second contiguous region 806 overlaps the first bounding box 810 and the second bounding box 820. However, because a greater portion (e.g., more pixels) of the second contiguous region 806 lies within the first bounding box 810 than the second bounding box 820, the second contiguous region 806 may be paired with the first bounding box 810 for filtering purposes. Accordingly, there is a one-to-one pairing of contiguous regions to bounding boxes and thus no need to eliminate any contiguous regions from the current capacitive image 800A.

In some embodiments, the CR filter sub-module 226 may trim the first contiguous region 802 so that it more accurately reflects a finger touch input without the presence of moisture. For example, the CR filter sub-module 226 may analyze the shape and/or pixel amplitudes of the first contiguous region 802 to determine what region of the contiguous region is most likely to coincide with a user's finger. In some aspects, the user input may coincide with the pixel(s) having the highest amplitude in a corresponding delta image (e.g., obtained by subtracting one or more previously captured capacitive images from the current capacitive image 800A), such as described above with respect to FIG. 6A. From there, the CR filter sub-module 226 may perform a breadth-first search to determine the likely pixel boundary of each user input (e.g., corresponding to the square cluster of pixels centered around the pixel with the highest amplitude). Any pixels lying outside the boundary of each user input (e.g., the nine pixels surrounding the square cluster) may be trimmed or eliminated before passing the first contiguous region 802 on for further processing.

Figure 8C:
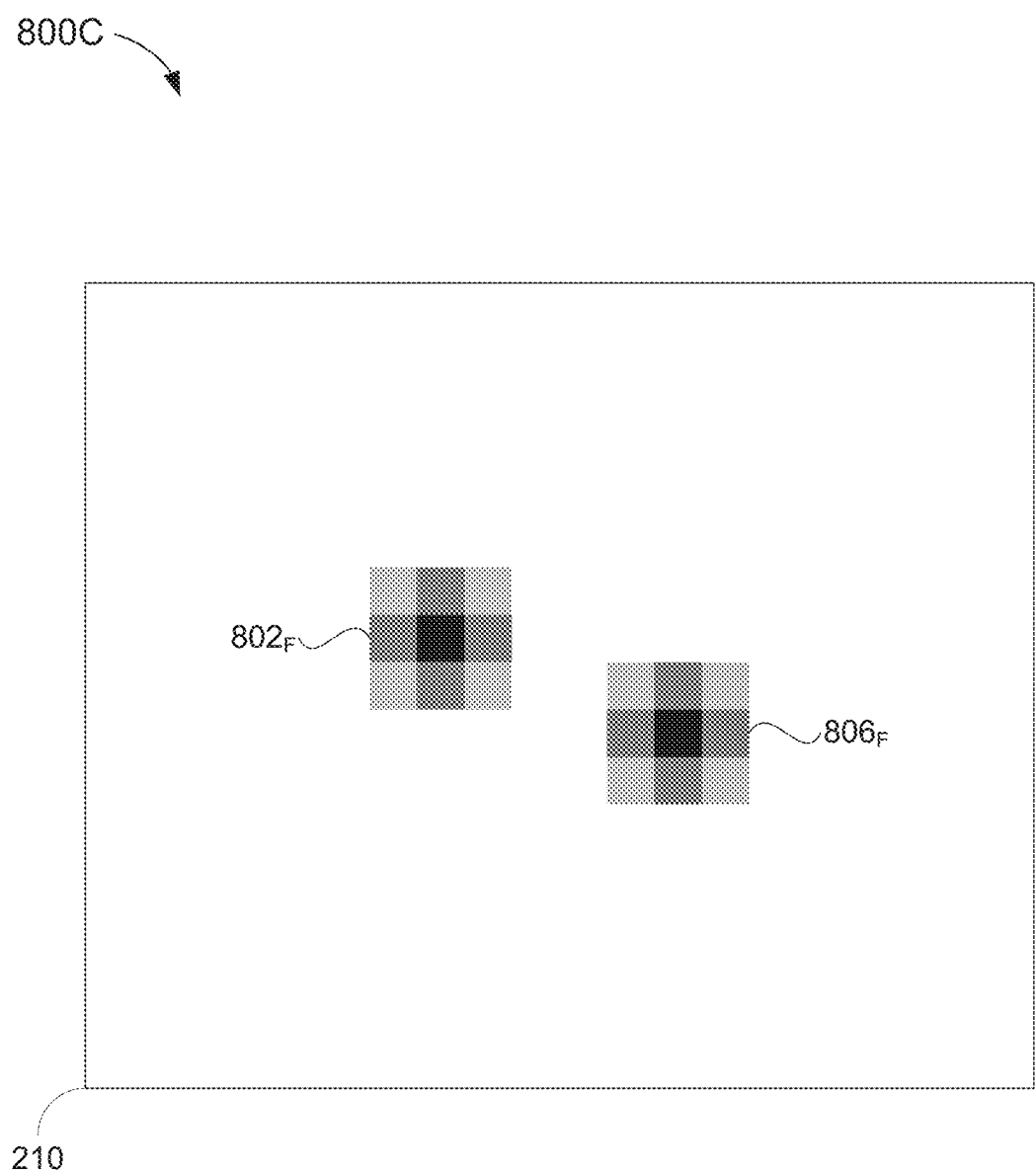

With reference to the example filtering step 800C depicted in FIG. 8C, only contiguous regions 802 (as trimmed) and 806 remain after the current iteration of the filtering process. Accordingly, contiguous regions 802 and 806 may be passed on to a processing system (e.g., as filtered contiguous regions 802F and 806F, respectively) to be processed as user inputs.

Figure 9A:
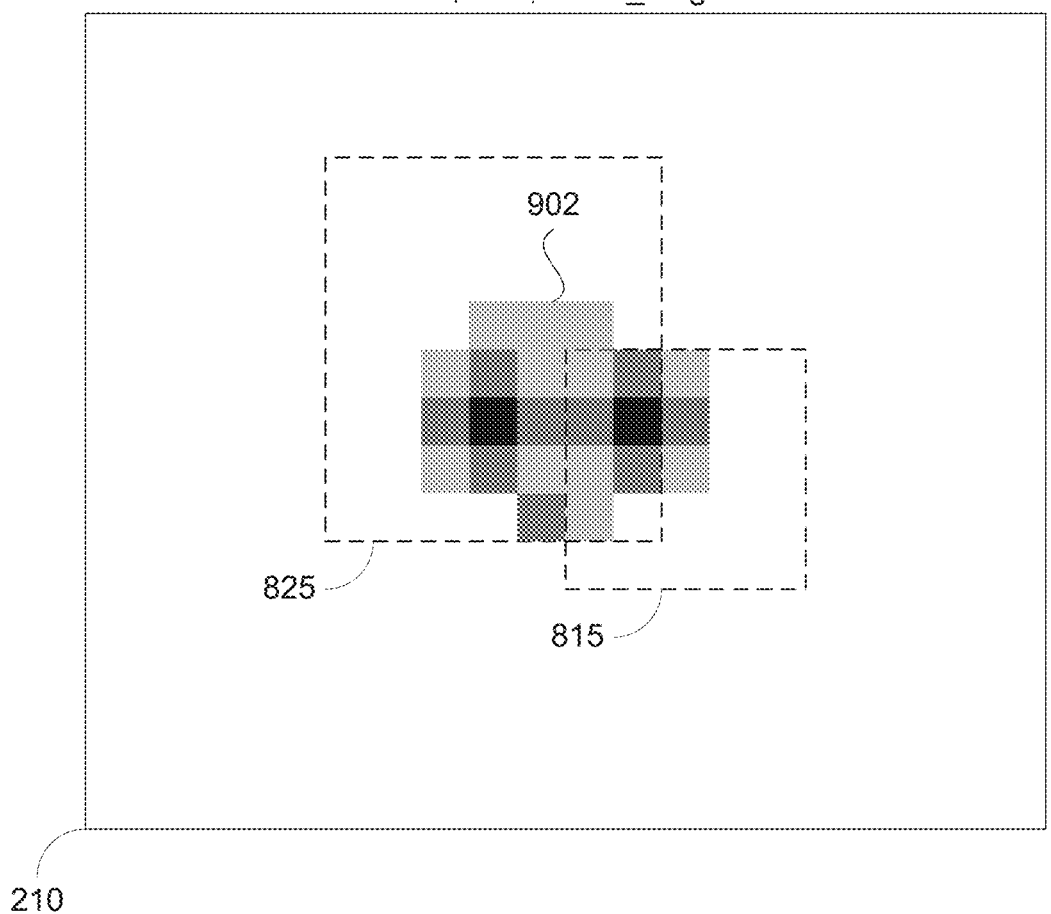
FIG. 9A shows an example capacitive image captured after the capacitive image depicted in FIG. 8A.

FIG. 9A shows an example capacitive image 900A captured after the capacitive image 800A depicted in FIG. 8A. The capacitive image capture sub-module 222 may generate the capacitive image 900A based on sensor information received from the capacitive sensors 212 during a scan of the sensing region (e.g., subsequent to the scan performed in FIG. 8A).

The CR identification sub-module 224 may identify a single contiguous region 902 in the capacitive image 900A. For example, the contiguous region 902 may reflect the completed gesture of the user's finger's pinching together, in the presence of moisture, in the sensing region 210. Thus, the contiguous region 902 may be formed by the union of the first contiguous region 302, the second contiguous region 304, and the third contiguous region 306 of FIG. 3. For example, the contiguous region 902 includes two adjoining square-shaped clusters of nine pixels each (e.g., corresponding to the first contiguous region 302 and the third contiguous region 306), in the center of the sensing region 210, and five adjacent pixels (e.g., corresponding to the second contiguous region 304) surrounding the two square-shaped clusters.

In the example of FIG. 9A, the contiguous region 902 overlaps the first dilated bounding box 815 and the second dilated bounding box 825 associated with the previous capacitive image 800A. Furthermore, the maximum number of supported inputs have already been detected (e.g., N=M=2). Thus, the CR filter sub-module 226 may determine that there are no new user inputs detected in the current capacitive image 900A. However, because the current capacitive image 900A includes only one contiguous region 902, while there were two bounding boxes 815 and 825 associated with the previous capacitive image 800A, the contiguous region filtering sub-module may determine that the single contiguous region 902 of the current capacitive image 900A was likely formed by the union of two contiguous regions from the previous capacitive image 800A. In some implementations, a pinch or zoom gesture may be detected when two or more user inputs are brought together (e.g., in a pinching motion). Thus, in some embodiments, the CR filter sub-module 226 may assert a "pinch flag" (e.g., Pinch_Flag=1) to indicate that a pinch or zoom condition is satisfied when a single contiguous region of the current capacitive image overlaps two or more bounding boxes from the previous capacitive image.

Figure 9B:
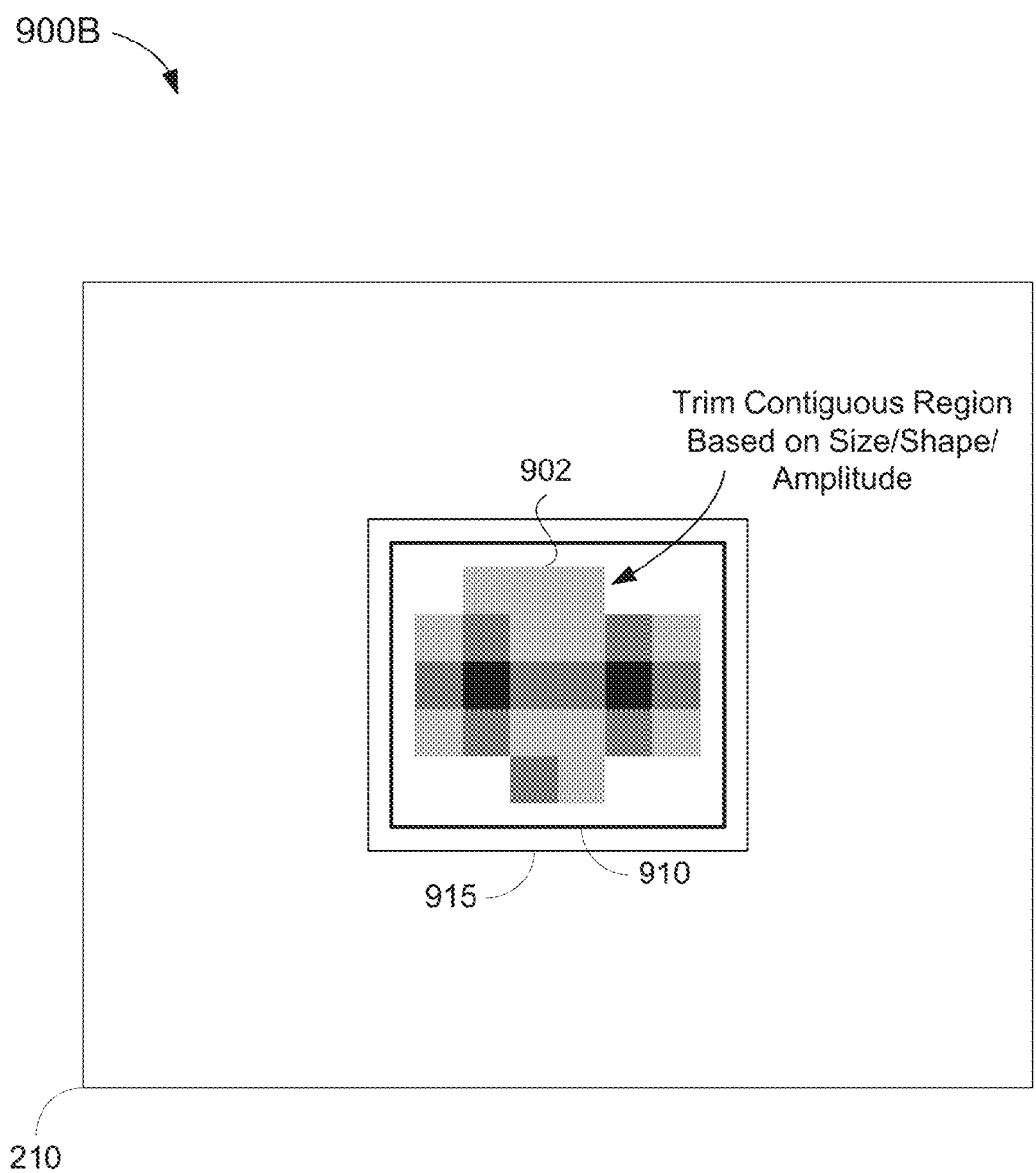
FIGS. 9B and 9C show an example contiguous region filtering process performed on the capacitive image of FIG. 9A.

The CR filter sub-module 226 may then proceed to filter the contiguous region 902 of the current capacitive image 900A. As described above, the CR filter sub-module 226 may construct, at most, two bounding boxes in the current capacitive image 900A. However, because the current capacitive image includes only one contiguous region 902, the CR filter sub-module 226 may construct only one bounding box in the current capacitive image 900A. With reference to the example filtering step 900B depicted in FIG. 9B, the CR filter sub-module 226 may construct a bounding box 910 around the contiguous region 902. In some embodiments, the CR filter sub-module 226 may further dilate the bounding box 910 to account for possible movements by the contiguous region 902. For example, the dilated bounding box 915 may represent a future search space of the contiguous region 902.

Finally, the CR filter sub-module 226 may use heuristics to eliminate and/or trim the contiguous region in the current capacitive image 900A. Since there is already a one-to-one pairing of contiguous regions to bounding boxes, there is no need to eliminate any contiguous regions from the current capacitive image 900B. In some embodiments, the CR filter sub-module 226 may trim the contiguous region 902 to remove any distortion due to moisture. For example, the CR filter sub-module 226 may analyze the shape and/or pixel amplitudes of the contiguous region 902 to determine what region(s) of the contiguous region is most likely to coincide with a user's finger. In some aspects, the user input may coincide with the pixel(s) having the highest amplitude in a corresponding delta image (e.g., obtained by subtracting one or more previously captured capacitive images from the current capacitive image 900A), such as described above with respect to FIG. 5.

CR filter sub-module 226 may then perform a breadth-first search to determine the likely pixel boundary of each user input (e.g., corresponding to the square clusters of pixels centered around each of the highest-amplitude pixels from the delta image). In some embodiments, the CR filter sub-module 226 may identify two or more user inputs within the same contiguous region. In the present example, there are two "peaks" (e.g., corresponding to the two darkest pixels) in the contiguous region 902 that are associated with substantially higher pixel amplitudes than the rest of the contiguous region 902. Thus, each of these peaks may coincide with a distinct user input. In some embodiments, the CR filter sub-module 226 may "split" the contiguous region 902 into two contiguous regions (902F and 906F) coinciding with the respective user inputs. Any pixels lying outside the boundary of each user input (e.g., the five pixels surrounding each square cluster) may be trimmed or eliminated before passing the contiguous regions 902F and 906F on for further processing.

Figure 9C:
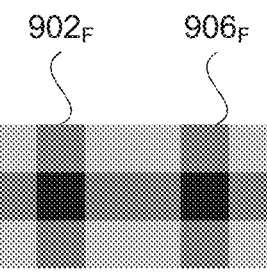

With reference to the example filtering step 900C depicted in FIG. 9C, two contiguous regions 902F and 906F (as trimmed) remain after the current iteration of the filtering process. Accordingly, the contiguous regions 902F and 906F may be passed on to a processing system to be processed as user inputs. Furthermore, with the pinch flag asserted (e.g., Pinch_Flag=1), the processing system may interpret the user inputs associated with the contiguous regions 902F and 906F as a pinch or zoom gesture. In some embodiments, the CR filter sub-module 226 may deassert the pinch flag (e.g., Pinch_Flag=0) when at least one of the contiguous regions 902F and/or 906F disappears from the capacitive image (e.g., corresponding to one or more of the user's fingers lifting off the sensing region 210) or the distance between the contiguous regions 902F and 906F increases (e.g., corresponding to the user's fingers separating in the sensing region 210).

Figure 10:
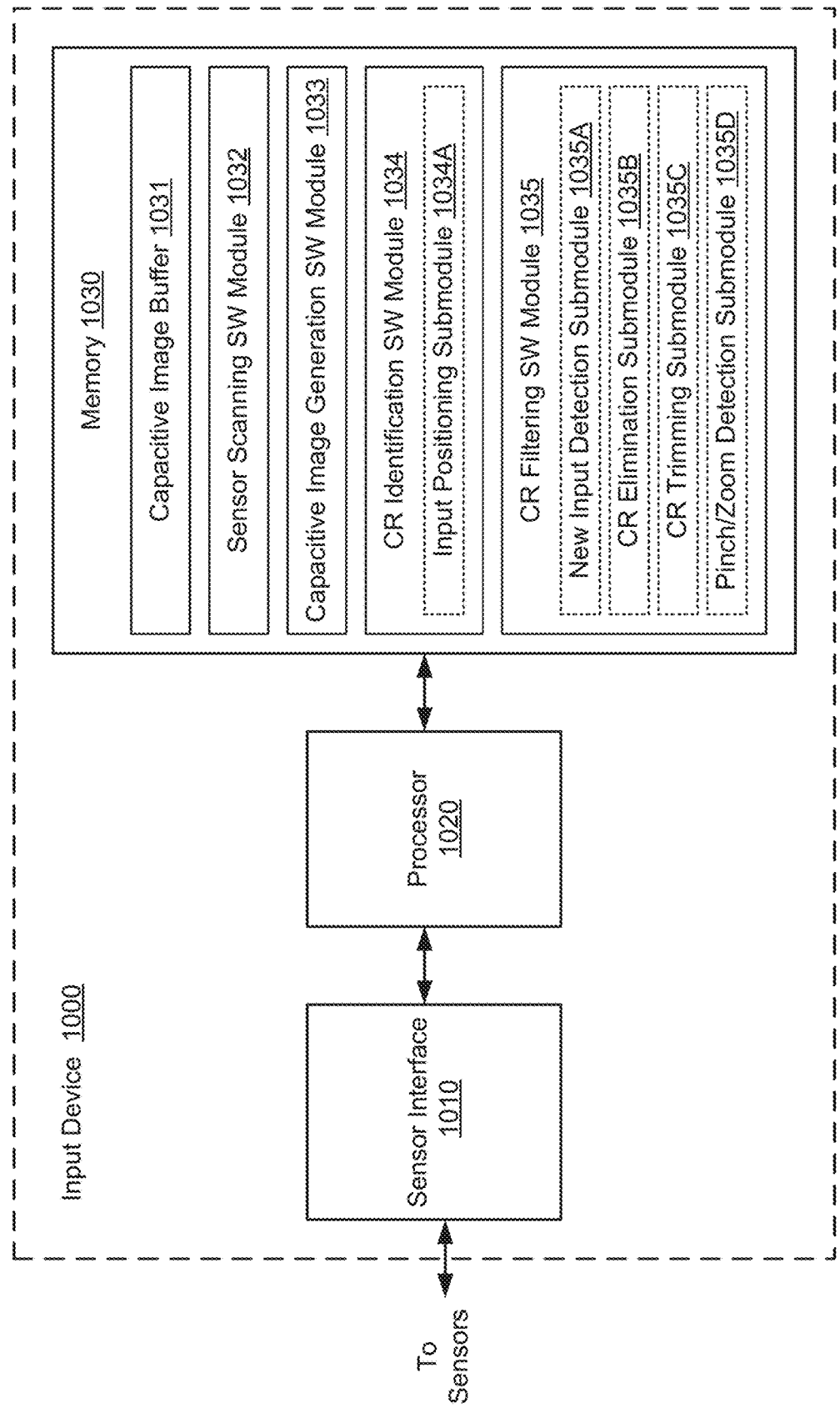
FIG. 10 is a block diagram of an input device capable of filtering multi-touch inputs based on capacitive sensing, in accordance with some other embodiments.

FIG. 10 is a block diagram of an input device 1000 capable of filtering multi-touch inputs based on capacitive sensing, in accordance with some other embodiments. The input device 1000 may be an embodiment of the input device 100 of FIG. 1 and/or the input device 200 of FIG. 2. In some embodiments, the input device 1000 may include a sensor interface 1010, a processor 1020, and a memory 1030.

The sensor interface 1010 may be used to communicate with one or more capacitive sensors (not shown for simplicity). For example, the sensor interface 1010 may be configured to transmit signals to, and receive signals from, one or more capacitive sensors (such as capacitive sensors 212 of FIG. 2) to detect objects in a sensing region of the input device 1000.

The memory 1030 includes a capacitive image buffer 1031 that may store a number of capacitive images of the sensing region. In some embodiments, the capacitive image buffer 1031 may be implemented as a circular buffer that is configured to store only a limited number of capacitive images (e.g., by discarding the oldest capacitive image each time a new capacitive image is stored in the buffer 1031).

The memory 1030 may also include a non-transitory computer-readable medium (e.g., one or more nonvolatile memory elements, such as EPROM, EEPROM, Flash memory, a hard drive, etc.) that may store at least the following software (SW) modules:
- a sensor scanning SW module 1032 to acquire sensor information about the sensing region via a plurality of sensor electrodes;
- a capacitive image generation SW module 1033 to generate a capacitive image of the sensing region based on the sensor information;
- a contiguous region (CR) identification SW module 1034 to determine a set of contiguous regions in the capacitive image, the CR identification SW module 1034 further including:
  - an input positioning submodule 1034A to determine positional information for inputs associated with one or more contiguous regions in the capacitive image; and
- a CR filtering SW module 1035 to select, from the set of contiguous regions, one or more contiguous regions that correspond to valid inputs based at least in part on a number of previously-acquired capacitive images of the sensing region, the CR filtering SW module 1035 further including:
  - a new input detection submodule 1035A to identify contiguous regions that correspond to new inputs based on a number of previously-acquired capacitive images of the sensing region;
  - a CR elimination submodule 1035B to eliminate one or more contiguous regions in the capacitive image that do not correspond to valid inputs;
  - a CR trimming submodule 1035C to trim one or more contiguous regions in the capacitive image corresponding to valid inputs; and
  - a pinch/zoom detection submodule 1035D to determine whether a pinch or zoom gesture is performed in the sensing region.

Each software module includes instructions that, when executed by the processor 1020, cause the input device 1000 to perform the corresponding functions. The non-transitory computer-readable medium of memory 1030 thus includes instructions for performing all or a portion of the operations described below with respect to FIGS. 11 and 12.

Processor 1020 may be any suitable one or more processors capable of executing scripts or instructions of one or more software programs stored in the input device 1000 (e.g., within memory 1030). For example, the processor 1020 may execute the sensor scanning SW module 1032 to acquire sensor information about the sensing region via a plurality of sensor electrodes. The processor 1020 may also execute the capacitive image generation SW module 1033 to generate a capacitive image of the sensing region based on the sensor information. Still further, the processor 1020 may execute the CR identification SW module 1034 to determine a set of contiguous regions in the capacitive image. In executing the CR identification SW module 1034, the processor 1020 may further execute the input positioning submodule 1034A to determine positional information for inputs associated with one or more contiguous regions in the capacitive image.

The processor 1020 may execute the CR filtering SW module 1035 to select, from the set of contiguous regions, one or more contiguous regions that correspond to valid inputs based at least in part on a number of previously-acquired capacitive images of the sensing region. In executing the CR filtering SW module 1035, the processor 1020 may further execute the new input detection submodule 1035A, the CR elimination submodule 10358, the CR trimming submodule 1035C, and/or the pinch/zoom detection submodule 1035D. For example, the processor 1020 may execute the new input detection submodule 1035A to identify contiguous regions that correspond to new inputs based on a number of previously-acquired capacitive images of the sensing region. Further, the processor 1020 may execute the CR elimination submodule 1035B to eliminate one or more contiguous regions in the capacitive image that do not correspond to valid inputs. The processor 1020 may also execute the CR trimming submodule 1035C to trim one or more contiguous regions in the capacitive image corresponding to valid inputs. Still further, the processor 1020 may execute the pinch/zoom detection submodule 1035D to determine whether a pinch or zoom gesture is performed in the sensing region.

Figure 11:
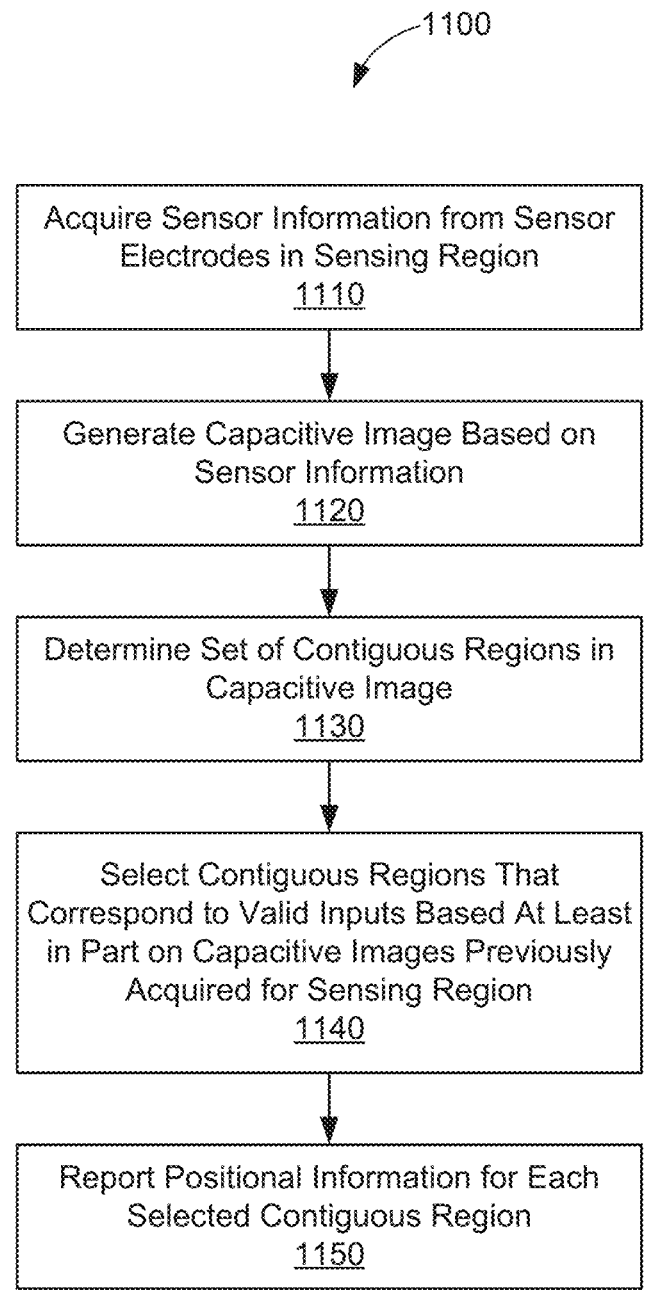
FIG. 11 is an illustrative flowchart depicting an example operation for detecting touch inputs based on capacitive images.

FIG. 11 is an illustrative flowchart depicting an example operation 1100 for detecting touch inputs based on capacitive images. With reference, for example to FIG. 2, the operation 1100 may be performed by the input device 200 to detect inputs in the sensing region 210 based on sensor information received from the capacitive sensors 212. More specifically, the operation 1100 may be performed to filter the received sensor information, for example, to distinguish valid inputs (such as from a finger, stylus, or other input device) from interference objects (such as from water, moisture, or debris) that may be present in the sensing region 210.

The input device 200 may acquire sensor information about a sensing region of an input device from sensor electrodes configured for capacitive sensing (1110). For example, the sensor information may correspond to capacitive sensing information generated by the capacitive sensors 212. In some embodiments, the capacitive sensors 212 may generate the capacitive sensing information in response to changes in the capacitance of one or more sensor electrodes coupled to the sensing region 210. For example, the changes in capacitance may correspond to user inputs 140 and/or interference objects 150 detected in, or proximate to, the sensing region 210.

The input device 200 generates a capacitive image based on the received sensor information (1120). In some embodiments, the capacitive image capture sub-module 222 may combine or aggregate the sensor information received from each of the capacitive sensors 212 to generate a capacitive image of the sensing region 210 (e.g., as described above with respect to FIG. 3). The capacitive image may represent a snapshot of the capacitive couplings in the sensing region 210 at any given time. More specifically, each pixel of the capacitive image may represent an area of localized capacitive coupling between a particular transmitter sensor electrode and a corresponding receiver sensor electrode. The amplitude (or weight) of a particular pixel in the capacitive image may correspond to the capacitance level (or change in capacitance) detected by the receiver sensor electrode associated with that pixel.

The input device 200 may determine a set of contiguous regions in the capacitive image (1130). In some embodiments, the CR identification sub-module 224 may identify one or more contiguous regions in the capacitive image that correspond with objects of interest in the sensing region 210 (e.g., as described above with respect to FIG. 3). As described above, a contiguous region may represent a number of connected or adjacent pixels with amplitudes exceeding a threshold amplitude. For example, the CR identification sub-module 224 may compare the sensor information received from each of the capacitive sensors 212 with a threshold capacitance level for the corresponding sensor electrode to identify one or more pixel contiguous regions in a corresponding capacitive image. In some aspects, the CR identification sub-module 224 may use image segmentation techniques to determine the pixel boundaries of each contiguous region.

The input device 200 may further select one or more contiguous regions that correspond to valid inputs based, at least in part, on previously-generated capacitive images (1140). For example, the CR filter sub-module 226 may filter the contiguous regions identified in the current capacitive image to prevent any contiguous regions associated with interference objects in the sensing region 210 from being processed as user inputs. In some embodiments, the CR filter sub-module 226 may filter one or more contiguous regions identified in the current capacitive image based on a number of previously-generated capacitive images stored in the capacitive image buffer 230 (e.g., as described above with respect to FIGS. 3-9C). In some embodiments, the capacitive image buffer 230 may be a circular buffer configured to store a limited number of prior capacitive images. For example, the capacitive image buffer 230 may discard the oldest capacitive image each time a new capacitive image is captured and stored in the buffer 230.

The input device 200 may then report positional information for each of the selected contiguous regions (1150). For example, the positional information may be reported to a processing system of the input device 200. The processing system may use the positional information to process user inputs associated with the selected contiguous regions. In some embodiments, the processing system may respond to user input in the sensing region 210 by triggering one or more actions. Example actions include changing an operation mode of the input device 200 and/or graphical user interface (GUI) actions such as cursor movement, selection, menu navigation, and the like.

Figure 12:
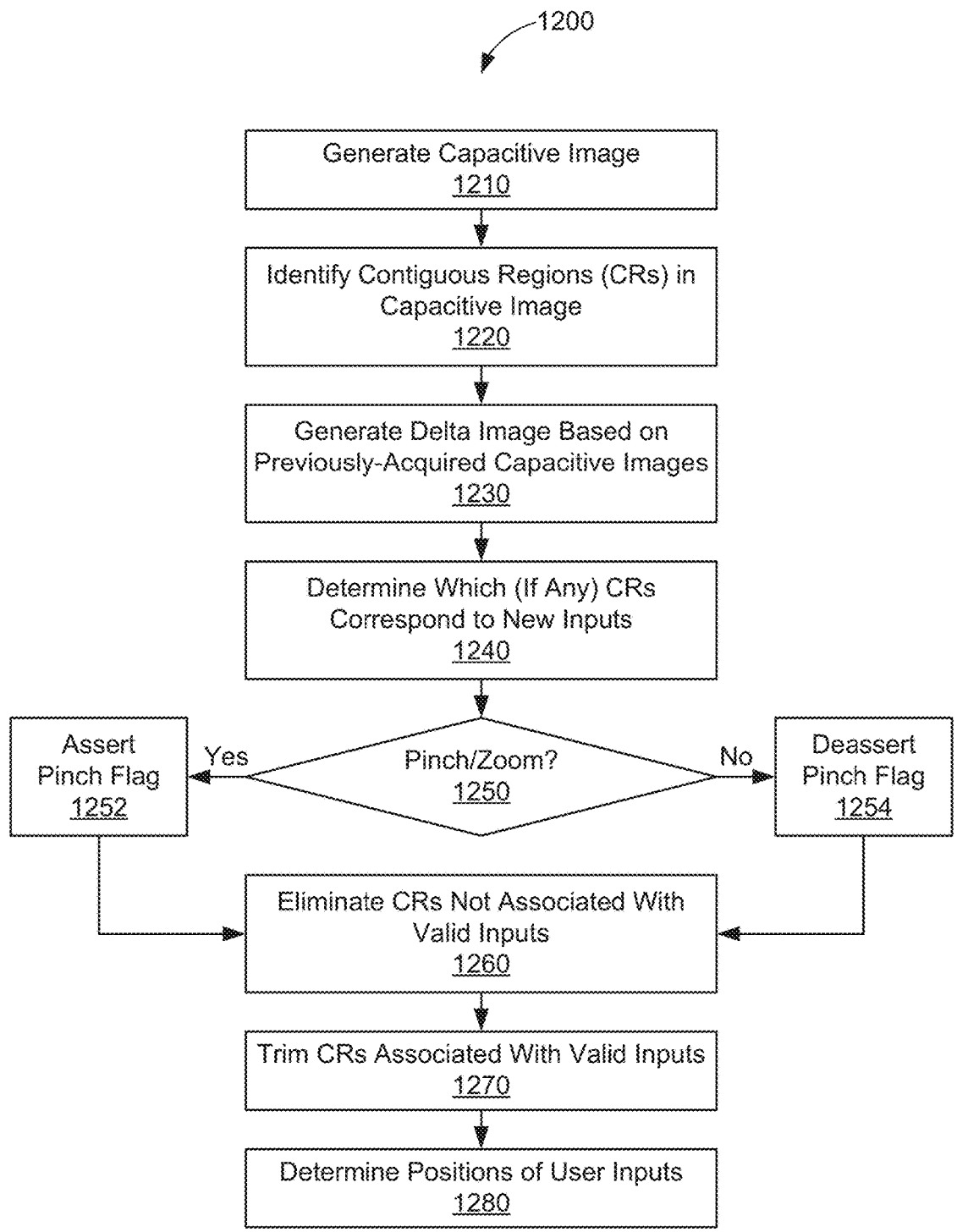
FIG. 12 is an illustrative flowchart depicting an example operation for filtering multi-touch inputs using multiple capacitive images.

FIG. 12 is an illustrative flowchart depicting an example operation 1200 for filtering multi-touch inputs using multiple capacitive images. With reference, for example, to FIG. 2, the operation 1200 may be performed by the input device 200 to filter the detection of objects in the sensing region 210 to distinguish valid inputs (such as from a finger, stylus, or other input device) from interference objects (such as from water, moisture, or debris).

The input device 200 generates a capacitive image of the sensing region (1210). In some embodiments, the capacitive image capture sub-module 222 may combine or aggregate sensor information received from each of the capacitive sensors 212 to generate a capacitive image of the sensing region 210 (e.g., as described above with respect to FIG. 3). The capacitive image may represent a current snapshot of the capacitive couplings in the sensing region 210.

The input device 200 may further identify a set of contiguous regions in the capacitive image (1220). In some embodiments, the CR identification sub-module 224 may identify one or more contiguous regions in the current capacitive image that correspond with objects of interest in the sensing region 210 (e.g., as described above with respect to FIG. 3). For example, a contiguous region may represent a number of connected or adjacent pixels with amplitudes exceeding a threshold amplitude. In some aspects, the CR identification sub-module 224 may use image segmentation techniques to determine the pixel boundaries of each contiguous region.

The input device generates a delta image based on previously-acquired capacitive images of the sensing region (1230). In some embodiments, the CR filter sub-module 226 may generate the delta image based on differences between the current capacitive image and one or more capacitive images previously acquired for the sensing region (e.g., as described above with respect to FIG. 4). The resulting delta image may be interpreted as a heat map highlighting any changes in pixel values between the current capacitive image and the one or more previously-acquired capacitive images. For example, newly-identified contiguous regions may appear with relatively high amplitudes, while more persistent contiguous regions may appear with substantially lower amplitudes (or not at all), in the delta image.

The input device may then determine which, if any, of the contiguous regions identified in the current capacitive image correspond to new inputs (1240). As described above, newly-identified contiguous regions may appear with relatively high amplitudes in the delta image. However, to determine whether a newly-identified contiguous region corresponds with a new user input (e.g., rather than a previously-identified user input that has undergone a change in shape or intensity, and/or moved to a new location), the CR filter sub-module 226 may compare the newly-identified contiguous regions with a set of bounding boxes associated with a previous capacitive image (e.g., as described above with respect to FIG. 5). For example, the set bounding boxes may indicate respective boundaries of contiguous regions corresponding to valid inputs in the previous capacitive image.

In some aspects, the CR filter sub-module 226 may associate a newly-identified contiguous region with a new user input when the contiguous region does not overlap any of the bounding boxes associated with the previous capacitive image and the number of bounding boxes is less than a maximum number of inputs detectable by the input device 200. In some other aspects, the CR filter sub-module 226 may merge the newly-identified contiguous region with another contiguous region in the current capacitive image when the contiguous region overlaps at least one of the bounding boxes associated with the previous capacitive image or the number of bounding boxes is equal to the maximum number of inputs detectable by the input device.

The input device 200 may further determine whether a pinch or zoom condition has been satisfied (1250). For example, a pinch or zoom gesture may be detected when two or more user inputs are brought together (e.g., combined) in the sensing region. In some embodiments, the CR filter sub-module 226 may detect a pinch or zoom condition is satisfied when a single contiguous region of the current capacitive image overlaps two or more bounding boxes from the previous capacitive image (e.g., as described above with respect to FIG. 9A). If the pinch or zoom condition is satisfied (as tested at 1250), the CR filter sub-module 226 may assert a pinch flag (or maintain the pinch flag in an asserted state) to indicate that a pinch or zoom gesture has been detected in the sensing region (1252). However, if the pinch or zoom condition is not satisfied (as tested at 1250), the CR filter sub-module 226 may deassert the pinch flag (or maintain the pinch flag in a deasserted state) to indicate that no pinch or zoom gesture has been detected in the sensing region (1254).

In some aspects, the input device 200 may eliminate one or more contiguous regions that are not associated with valid inputs (1260). For example, the CR filter sub-module 226 may use heuristics to identify and eliminate any contiguous regions, in the current capacitive image, that are not likely to correspond with valid inputs. In some embodiments, the CR filter sub-module 226 may analyze the shape and/or pixel amplitudes of each contiguous region to determine whether a particular contiguous region is more likely to correspond to a user input (such as a finger touch) or an interference object (such as moisture). If there is more than one contiguous region in a particular bounding box of the current capacitive image, the CR filter sub-module 226 may keep only the contiguous region that most closely fits the heuristic model of a user input (and eliminate the remaining contiguous regions) in that bounding box (e.g., as described above with respect to FIGS. 6A and 6B).

In some other aspects, the input device 200 may trim one or more contiguous regions that are associated with valid inputs (1270). For example, the CR filter sub-module 226 may use heuristics to identify pixel boundaries associated with user inputs, in the current capacitive image, and trim any pixels that are outside the identified boundaries. In some embodiments, the CR filter sub-module 226 may analyze the shape and/or pixel amplitudes of each contiguous region to determine what portion of the contiguous region is most likely to coincide with a user's finger, stylus, or other input device. For example a user input may coincide with the pixel(s) having the highest amplitudes in the corresponding delta image. From there, the CR filter sub-module 226 may perform a breadth-first search to determine the likely pixel boundary of each user input, and trim any pixels lying outside such boundaries (e.g., as described above with respect to FIGS. 7B and 7C).

Finally, the input device 200 may determine the respective positions of user inputs in each of the remaining contiguous regions (1280). In some embodiments, the CR identification sub-module 224 (or the CR filter sub-module 226) may determine the location of pixels corresponding to the user inputs based at least in part on the delta image. For example, a user input may coincide with a set of one or more pixels having the highest amplitudes in the delta image. In some aspects, the input device 200 may report positional information, for the remaining contiguous regions (e.g., after eliminating and/or trimming one or more of the contiguous regions), to a processing system for further processing. For example, the positional information may be used to process user inputs associated with the remaining contiguous regions.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
a plurality of sensor electrodes configured for capacitive sensing in a sensing region of the input device;
processing circuitry; and
a memory storing instructions that, when executed by the processing circuitry, cause the input device to:
acquire sensor information about the sensing region via the plurality of sensor electrodes;
generate a first capacitive image of the sensing region based on the sensor information;
determine a set of contiguous regions in the first capacitive image;
select, from the set of contiguous regions, one or more contiguous regions that correspond to valid inputs by:
generating a delta image based on differences between the first capacitive image and a plurality of capacitive images previously acquired for the sensing region;
associating each contiguous region in the set of contiguous regions with one or more pixel values from the delta image; and
determining, for each contiguous region in the set of contiguous regions, whether the contiguous region corresponds with a new input based at least in part on the associated pixel values from the delta image; and
process user inputs associated with the selected contiguous regions.

2. The input device of claim 1, further comprising:
a circular buffer configured to store a number of capacitive images of the sensing region.

3. The input device of claim 1, wherein execution of the instructions further causes the input device to:
identify a position of a corresponding input in each of the selected contiguous regions based at least in part on the associated pixel values from the delta image; and
report positional information for the identified position in each of the selected contiguous regions.

4. The input device of claim 1, wherein execution of the instructions further causes the input device to:
detect that one of the selected contiguous regions is associated with two or more inputs based at least in part on the associated pixel values from the delta image; and
split the detected contiguous region into two or more contiguous regions based on the associated pixel values from the delta image.

5. The input device of claim 1, wherein execution of the instructions to determine whether the contiguous region corresponds with a new input causes the input device to:
compare the associated pixel values with a threshold value; and
when the associated pixel values exceed the threshold value, selectively associate the contiguous region with a new input based at least in part on a number of contiguous regions identified in a previous capacitive image.

6. The input device of claim 5, wherein execution of the instructions to selectively associate the contiguous region with a new input causes the input device to:
determine a number of contiguous regions corresponding to valid inputs in the previous capacitive image;
compare the number of contiguous regions with a maximum number (M) of inputs detectable by the input device; and
selectively associate the contiguous region with a new input based at least in part on the comparison.

7. The input device of claim 6, wherein execution of the instructions further causes the input device to:
identify a set of first bounding boxes indicating respective boundaries of each of the contiguous regions corresponding to valid inputs in the previous capacitive image.

8. The input device of claim 7, wherein the contiguous region is associated with a new input when the contiguous region does not overlap any of the first bounding boxes and the number of contiguous regions is less than the maximum number of inputs detectable by the input device.

9. The input device of claim 7, wherein the contiguous region is merged with another contiguous region in the set of contiguous regions when the contiguous region overlaps at least one of the first bounding boxes or the number of contiguous regions is equal to the maximum number of inputs detectable by the input device.

10. The input device of claim 7, wherein execution of the instructions further causes the input device to:
detect a pinch or zoom gesture when two or more of the first bounding boxes intersect and a first contiguous region in the set of contiguous regions overlaps each of the two or more first bounding boxes.

11. The input device of claim 10, wherein the first contiguous region is formed from a union of two or more contiguous regions corresponding to valid inputs in the previous capacitive image.

12. The input device of claim 7, wherein execution of the instructions to select the one or more contiguous regions that correspond to valid inputs further causes the input device to:
generate up to M second bounding boxes around one or more contiguous regions in the set of contiguous regions;
pair each of the second bounding boxes with a respective contiguous region in the set of contiguous regions; and
eliminate any contiguous regions, in the set of contiguous regions, not paired with a respective one of the second bounding boxes.

13. The input device of claim 12, wherein execution of the instructions to pair each of the second bounding boxes with a respective contiguous region causes the input device to:
detect that a particular contiguous region in the set of contiguous regions overlaps two or more of the second bounding boxes; and determine that the particular contiguous region coincides with one of the two or more second bounding boxes based on an amount of overlap between the particular contiguous region and each of the two or more second bounding boxes.

14. The input device of claim 12, wherein execution of the instructions to pair each of the second bounding boxes with a respective contiguous region causes the input device to:
detect that a particular bounding box of the second bounding boxes coincides with two or more contiguous regions in the set of contiguous regions;
determine which of the two or more contiguous regions is most likely to correspond with a valid input based on a shape or amplitude of each of the two or more contiguous regions; and
pair the particular bounding box with the contiguous region that is most likely to correspond with a valid input.

15. The input device of claim 12, wherein execution of the instructions further causes the input device to:
trim the respective contiguous region paired with each of the second bounding boxes based at least in part on the associated pixel values from the delta image.

16. A method of operating an input device, comprising:
acquiring sensor information about a sensing region via a plurality of sensor electrodes configured for capacitive sensing;
generating a first capacitive image of the sensing region based on the sensor information;
determining a set of contiguous regions in the first capacitive image;
selecting, from the set of contiguous regions, one or more contiguous regions that correspond to valid inputs by:
generating a delta image based on differences between the first capacitive image and a plurality of capacitive images previously acquired for the sensing region;
associating each contiguous region in the set of contiguous regions with one or more pixel values from the delta image; and
determining, for each contiguous region in the set of contiguous regions, whether the contiguous region corresponds with a new input based at least in part on the associated pixel values from the delta image; and
processing user inputs associated with the selected contiguous regions.

17. The method of claim 16, further comprising:
identifying a position of a corresponding input in each of the selected contiguous regions based at least in part on the associated pixel values from the delta image; and
reporting positional information for the identified position in each of the selected contiguous regions.

18. The method of claim 16, further comprising:
detecting that one of the selected contiguous regions is associated with two or more inputs based at least in part on the associated pixel values from the delta image; and
splitting the detected contiguous region into two or more contiguous regions based on the associated pixel values from the delta image.

19. The method of claim 16, wherein determining whether the contiguous region corresponds with a new input comprises:
comparing the associated pixel values with a threshold value; and
when the associated pixel values exceed the threshold value, selectively associating the contiguous region with a new input based at least in part on a number of contiguous regions identified in a previous capacitive image.

20. The method of claim 19, wherein the selectively associating comprises:
determining a number of contiguous regions corresponding to valid inputs in the previous capacitive image;
comparing the number of contiguous regions with a maximum number (M) of inputs detectable by the input device; and
selectively associating the contiguous region with a new input based at least in part on the comparison.

21. The method of claim 20, further comprising:
identifying a set of first bounding boxes indicating respective boundaries of each of the contiguous regions corresponding to valid inputs in the previous capacitive image.

22. The method of claim 21, wherein the contiguous region is associated with a new input when the contiguous region does not overlap any of the first bounding boxes and the number of contiguous regions is less than the maximum number of inputs detectable by the input device, and wherein the contiguous region is merged with another contiguous region in the set of contiguous regions when the contiguous region overlaps at least one of the first bounding boxes or the number of contiguous regions is equal to the maximum number of inputs detectable by the input device.

23. The method of claim 21, further comprising:
detecting a pinch or zoom gesture when two or more of the first bounding boxes intersect and a first contiguous region in the set of contiguous regions overlaps each of the two or more first bounding boxes.

24. The method of claim 21, wherein the selecting further comprises:
generating up to M second bounding boxes around one or more contiguous regions in the set of contiguous regions;
pairing each of the second bounding boxes with a respective contiguous region in the set of contiguous regions; and
eliminating any contiguous regions, in the set of contiguous regions, not paired with a respective one of the second bounding boxes.

25. The method of claim 24, wherein the pairing comprises:
detecting that a particular bounding box of the second bounding boxes coincides with two or more contiguous regions in the set of contiguous regions;
determining which of the two or more contiguous regions is most likely to correspond with a valid input based on a shape or amplitude of each of the two or more contiguous regions; and
pairing the particular bounding box with the contiguous region that is most likely to correspond with a valid input.

26. The method of claim 24, further comprising:
trimming the respective contiguous region paired with each of the second bounding boxes based at least in part on the associated pixel values from the delta image.

27. A non-transitory computer-readable medium storing instructions that, when executed by processing circuitry of an input device, cause the input device to perform operations comprising:
acquiring sensor information about a sensing region via a plurality of sensor electrodes configured for capacitive sensing;

generating a first capacitive image of the sensing region based on the sensor information;
determining a set of contiguous regions in the first capacitive image;
selecting, from the set of contiguous regions, one or more contiguous regions that correspond to valid inputs by:
  generating a delta image based on differences between the first capacitive image and a plurality of capacitive images previously acquired for the sensing region;
  associating each contiguous region in the set of contiguous regions with one or more pixel values from the delta image; and
  determining, for each contiguous region in the set of contiguous regions, whether the contiguous region corresponds with a new input based at least in part on the associated pixel values from the delta image; and
processing user inputs associated with the selected contiguous regions.

* * * * *